United States Patent
Aoki et al.

(10) Patent No.: US 8,818,548 B2
(45) Date of Patent: Aug. 26, 2014

(54) WORK APPARATUS WITH SAFETY EQUIPMENT

(75) Inventors: Tatsuya Aoki, Kanagawa (JP); Tadashi Ishimura, Saitama (JP)

(73) Assignee: Yamabiko Corporation, Tokyo (JP)

( * ) Notice: Subject to any disclaimer, the term of this patent is extended or adjusted under 35 U.S.C. 154(b) by 583 days.

(21) Appl. No.: 12/783,838

(22) Filed: May 20, 2010

(65) Prior Publication Data

US 2010/0294097 A1 Nov. 25, 2010

(30) Foreign Application Priority Data

May 21, 2009 (JP) ................................ 2009-123598

(51) Int. Cl.
| | |
|---|---|
| *G06F 19/00* | (2011.01) |
| *B26D 5/00* | (2006.01) |
| *B26D 5/20* | (2006.01) |
| *B26D 1/00* | (2006.01) |
| *B26D 3/00* | (2006.01) |
| *B26D 7/27* | (2006.01) |
| *G05B 21/00* | (2006.01) |
| *A01D 34/82* | (2006.01) |
| *A01D 75/20* | (2006.01) |

(52) U.S. Cl.
CPC ............. *A01D 34/828* (2013.01); *A01D 75/20* (2013.01)
USPC ............... 700/177; 700/159; 700/174; 83/58; 83/522.12; 83/76.7; 83/13; 340/680

(58) Field of Classification Search
USPC ........ 700/177, 159, 174; 83/58, 522.12, 76.7, 83/13; 340/680
See application file for complete search history.

(56) References Cited

U.S. PATENT DOCUMENTS

| 3,606,745 A | 9/1971 | Girodat |
| 3,793,627 A * | 2/1974 | Darrel et al. .................. 340/680 |

(Continued)

FOREIGN PATENT DOCUMENTS

| JP | 62-198320 | 9/1987 |
| JP | 02-131822 | 11/1990 |

(Continued)

OTHER PUBLICATIONS

Extended European Search Report issued in corresponding European Patent Application No. 10163542.3 dated Aug. 31, 2010 (3 pages).

(Continued)

*Primary Examiner* — Kavita Padmanabhan
*Assistant Examiner* — Jason Lin
(74) *Attorney, Agent, or Firm* — Kilyk & Bowersox, P.L.L.C.

(57) ABSTRACT

In a brush cutter (100), when it is determined based on acceleration information including frequency components, supplied from an acceleration sensor (24) included in the brush cutter (100) that the acceleration shows a peak in a range of frequencies lower than 100 Hz, the flow moves to step S5 to amplify the acceleration peak. In next step S6, the acceleration peak is compared with a threshold. When the result of comparison shows that the acceleration peak is higher than the threshold, the flow moves to step S7 to produce a safety signal. The safety signal is output from the controller (26) to a high voltage generation circuit (30) to stop generation of a high voltage in the high voltage generating circuit (30). In this manner, the acceleration sensor (24) is used to detect any unexpected, sudden danger, while diminishing influence of the acceleration caused by vibration inherent to the own nature of the work apparatus, its intended regular operation and its posture change in regular operation.

10 Claims, 40 Drawing Sheets

(56) References Cited

U.S. PATENT DOCUMENTS

| | | | |
|---|---|---|---|
| 4,178,741 A | 12/1979 | Lonn et al. | |
| 4,707,687 A * | 11/1987 | Thomas et al. | 340/680 |
| 4,759,243 A * | 7/1988 | Thompson | 82/1.11 |
| 4,831,365 A * | 5/1989 | Thomas et al. | 340/680 |
| 6,604,013 B1 * | 8/2003 | Hamidieh et al. | 700/175 |
| 6,763,312 B1 * | 7/2004 | Judd | 702/56 |
| 6,898,551 B2 * | 5/2005 | Samata et al. | 702/182 |
| 7,606,673 B2 * | 10/2009 | Judd | 702/56 |
| 8,080,323 B2 * | 12/2011 | Ban et al. | 428/698 |
| 2004/0181951 A1 * | 9/2004 | Wittke | 30/382 |
| 2004/0230367 A1 * | 11/2004 | Miller et al. | 701/111 |
| 2005/0182541 A1 * | 8/2005 | Tamaizumi et al. | 701/41 |
| 2006/0090351 A1 | 5/2006 | Yoshida | |
| 2006/0214429 A1 * | 9/2006 | Kikuchi et al. | 290/44 |
| 2007/0169364 A1 * | 7/2007 | Townsend et al. | 33/512 |
| 2009/0210072 A1 * | 8/2009 | Gass et al. | 700/10 |
| 2009/0224914 A1 * | 9/2009 | Wehrenberg | 340/568.1 |
| 2010/0064532 A1 * | 3/2010 | Wittke et al. | 30/382 |
| 2010/0257743 A1 * | 10/2010 | George | 30/383 |

FOREIGN PATENT DOCUMENTS

| | | |
|---|---|---|
| JP | 04-158714 | 1/1992 |
| JP | 08-187024 | 7/1996 |
| JP | 2006-288296 | 10/2006 |
| JP | 2008-118960 | 5/2008 |

OTHER PUBLICATIONS

U.S. Appl. No. 12/783,886, filed May 20, 2010.
U.S. Appl. No. 12/784,536, filed May 21, 2010.

\* cited by examiner

To external device

To external device

To external device

WORK APPARATUS WITH SAFETY EQUIPMENT

The present application claims priority from Japanese Patent Application No. 2009-123598, filed May 21, 2009, which is incorporated herein by reference.

FIELD OF THE INVENTION

The present invention generally relates to a small outdoor-use work apparatus equipped with a cutting tool, such as a brush cutter, chain saw, hedge trimmer, etc., and more particularly, to a work apparatus equipped with a safety device for assuring safety of a worker at work with such a work apparatus.

BACKGROUND OF THE INVENTION

The above-mentioned hand-held small work apparatuses include a brush cutter used in mowing, chain saw used in logging or trimming, and a hedge trimmer used in hedge trimming, all of which are well-known. The brush cutter, chain saw, etc. use a cutting blade that moves at a high speed. For this reason, there have been developed work apparatuses provided with a safety device intended to protect the worker using the work apparatus from the cutting blade in order to assure his or her safety at occurrence of an unexpected situation during the work.

Japanese Utility Model Laid-open Publication No. H02 (1990)-131822 (hereafter referred to as "Patent Document 1" as well) discloses a shoulder-strap type brush cutter. On each of right and left handles of the brush cutter, a stop lever is provided. The stop lever is actuated when grasped by the worker. When the worker takes his/her hand off at least one of the right and left stop levers, namely, when the stop lever is released, a fuel valve mechanically linked to the stop lever is closed, and forcibly stops fuel supply to the engine or supply of power to an ignition plug of the engine to thereby stop the engine from running.

Japanese Patent Laid-open Publication No. H04(1992)-158714 (hereafter referred to as "Patent Document 2" as well) discloses a shoulder-strap type brush cutter in which a stop lever or pressure sensor is provided on each handle of the brush cutter to actuate an electromagnetic brake or mechanical stopper to thereby forcibly stop the cutting blade from rotating when the worker takes the hand off the handle.

Japanese Patent Laid-open Publication No. 2006-288296 (hereafter referred to as "Patent Document 3" as well) discloses a hand-held type electric motor-driven brush cutter having a shock sensor. The shock sensor includes a piezoelectric element that abuts a manipulation tube provided around a power transmission shaft connecting an electric motor as a drive source and a cutting blade to each other. When the shock sensor detects a shock, the motor is forcibly stopped. In this Patent Document 3, it is also proposed to provide, in the safety device including the shock sensor, a variable resistor for adjusting a current flowing through the shock sensor to eliminate the variation in sensitivity from one piezoelectric element to another.

Japanese Patent Laid-open Publication No. H08(1996)-187024 (hereafter referred to as "Patent Document 4" as well) discloses a shoulder-strap type brush cutter including an internal combustion engine or electric motor as a drive source and a centrifugal clutch interposed between the drive source and a power transmission shaft that mechanically connects the drive source and a cutting blade. The centrifugal clutch includes a clutch shoe that is mechanically activated by large relative displacement, if any, between the drive source and the power transmission shaft to automatically brake the centrifugal clutch.

Japanese Patent Laid-open Publication No. 2008-118960 (hereafter referred to as "Patent Document 5" as well) discloses a shoulder-strap type brush cutter. The strap for a worker to carry the brush cutter on his/her shoulder has a cap at its distal end, and it can detachably engage with a switch main body of the brush cutter. In this shoulder-strap type brush cutter, if the cutting blade hits a large stone or the like and the brush cutter is kicked back, the cap disengages from the switch body, and power supply to the ignition plug is forcibly interrupted to stop the engine.

Japanese Patent Laid-open Publication No. S62(1988)-198320 (hereafter referred to as "Patent Document 6" as well) proposes to provide a mercury switch that detects an angle of inclination of a manipulation tube in form of a sleeve covering a power transmission shaft that transmits the output of an electric motor to a cutting blade. In this proposal, once the detected inclination angle of the manipulation tube gets out of a predetermined range, power supply to the electric motor is interrupted to stop it forcibly.

Problems to be Solved by the Invention

The above-mentioned Patent Documents 1 to 6 disclose examples of safety devices for brush cutters. Of course, work apparatuses having other types of cutting blades should also preferably be equipped with such a safety device. Unexpected, sudden dangerous situations that may occur with these types of work apparatuses are described below taking a brush cutter as an example.

It is assumable that the worker using a brush cutter will become unable to control the brush cutter in any of the following three situations:

(1) The cutting blade has hit a hard obstacle such as a relatively large stone, stump or the like and the brush cutter has been kicked back.
(2) The worker at work with the brush cutter has fallen down off balance.
(3) Sensing a danger, the worker has thrown away the brush cutter.

The work apparatus should desirably be equipped with a safety device able to work reliably in any of the above three cases.

On the other hand, after the safety device is activated in one of those three situations and successfully keeps the worker safe, the worker in one piece will most probably resume the outstanding work in no time. Therefore, the safety device should satisfy this requirement.

Among the conventional safety devices of the aforementioned types, those ones disclosed in Patent Documents 1 and 2, for example, are designed to act only when a gripping force of the worker using the brush cutter is removed from the stop lever or pressure sensor on the handle of the machine. With this type of safety devices, the worker must always bear in mind what is required to activate the safety device. However, if the worker falls down off balance at work with the work apparatus, all his attention will be directed to regaining his footing, and will fail to unlink the hands from the handle. Otherwise, the worker might have been driven into a situation incapable of releasing his hand away from the handle. Therefore, the safety device should be designed to be automatically actuated, not depending upon a particular operation or behavior of the worker.

Let consideration be made again to the three situations very likely to expose the worker at work with a compact work apparatus having a cutting tool to danger, namely, (1) the situation where the machine cannot be controlled due to the kickback; (2) the situation where the worker falls down off balance; and (3) the situation where the machine is thrown onto the ground. One of features common to all of these situations is that the machine will exhibit an abnormal shake and a sudden change in posture. An acceleration sensor is suitable for use to detect such an abnormal shake and a sudden posture change. This is also true for the chain saw. If the worker becomes unable to control a chain saw due to the kickback, he may fall into an unsafe condition.

However, the work apparatus is subject to vibration occurring at its drive source itself, vibration occurring along the power path from the drive source to the cutting blade and, in addition, vibration or posture change inherent to normal manipulation of the machine by the worker (who will move the cutting blade right and left in case the work apparatus is a brush cutter). Therefore, appropriate countermeasures should be taken against such a normal vibration or posture change inherent to the intended function of such a work apparatus whichever acceleration sensor is adopted. The Inventors of the present invention selected a brush cutter driven by an air-cooled internal combustion engine (single-cylinder two-stroke engine) as a typical example, and attached an acceleration sensor on a drive unit of the brush cutter. With this sample, the Inventors measured acceleration due to the vibration of the drive unit itself and posture change of the drive unit in response to a normal cutting operation. FIGS. 1 to 3 show the data obtained by the measurement. The acceleration sensor attached to the drive unit was a uniaxial acceleration sensor having a single axis of detection. The measurement was done by driving the brush cutter in the same manner as in its brush-cutting operation, that is, by moving the cutting blade right and left with a hand gripping the handle. Therefore, the measured data shown in FIGS. 1 to 3 are not those taken during actual brush-cutting operation. The brush cutter used in the measurement is of a hand-held type with a single-cylinder engine mounted in the brush cutter in an orientation to let the axis of its cylinder bore extend vertically as well known.

FIG. 1 shows the vibration detected by the acceleration sensor fixed to the engine cover with the detection axis extending in the up-and-down (vertical) direction. In other words, the measured data shown in FIG. 1 are acceleration components included in up-and-down vibration. FIG. 2 shows the vibration detected by the acceleration sensor fixed to the engine cover with the detection axis extending in the front-and-rear direction (lengthwise direction). In other words, the measured data shown in FIG. 2 are acceleration components included in front-and-rear vibration. FIG. 3 shows the vibration detected by the acceleration sensor attached to the engine cover with the detection axis extending in the right-and-left direction. In other words, FIG. 3 shows acceleration components included in right-and-left vibration. In FIGS. 1 to 3, the dashed line indicates the data measured at the engine speed of 8,500 rpm and the solid line indicates the data measured at the engine speed of 10,000 rpm.

The terms "up-and-down direction", "front-and-rear direction" and "right-and-left direction" used herein are explained below. The term "up-and-down direction" defines the vertical direction of the brush cutter placed on a horizontal mount in its normal posture. This direction is parallel to the axial direction of the cylinder bore of the engine. The term "front-and-rear direction" means that as viewed from the worker who operates the brush cutter. It may be roughly paraphrased as the lengthwise direction of the manipulation tube (power transmission shaft that transmits the power of the engine to the cutting blade) of the brush cutter. The term "right-and-left direction" means the direction in which the cutting blade is moved during brush cutting operation. In other words, it is a lateral direction as viewed from the worker.

In brush cutting operation, the engine is driven at the speed of 8,000 to 10,000 rpm. With reference to FIGS. 1 to 3, in this normal region of engine speed, the detected acceleration shows peaks in a range of frequencies higher than about 100 Hz, while showing no peak in a range of frequencies lower than 100 Hz. It is remarked that the up-and-down vibration in FIG. 1 shows peaks higher than those of front-and-rear vibration (FIG. 2) and right-and-left vibration (FIG. 3).

According to an approximate overview, the most part of the acceleration shown in FIGS. 1 to 3 is a component derived from the vibration of the engine of the brush cutter used in the experiment and a component derived from the normal posture change of the brush cutter in the grass cutting simulation by the experimenter. These acceleration characteristics due to the vibration and posture change inherent to the normal function of the brush cutter will similarly appear also with the manipulation tube, for example. FIGS. 4 to 6 show data obtained by measurement with an acceleration sensor attached to the distal end portion of a manipulation tube of a brush cutter driven by a two-stroke engine.

FIG. 4 shows data obtained by measurement with the acceleration sensor fixed to the distal end portion of the manipulation tube in an orientation for the detection axis to extend in the up-and-down direction. FIG. 5 shows data obtained by measurement with the acceleration sensor fixed to the distal end portion of the manipulation tube in an orientation for the detection axis to extend in the front-and-rear direction. FIG. 6 shows data obtained by measurement with the acceleration sensor fixed to the distal end portion of the manipulation tube in an orientation for the detection axis to extend in the right-and-left direction. FIGS. 4 to 6 shows that the acceleration detected on the manipulation tube exhibits peaks in the range of frequencies higher than 100 Hz or so.

Further, such acceleration characteristics due to the vibration and posture change inherent to the normal function of the brush cutter are observed with chain saws and hedge trimmers as well. FIGS. 7 to 9 show data obtained by measurement with a chain saw driven by a two-stroke internal combustion engine. FIG. 7 shows up-and-down vibration, FIG. 8 shows front-and-rear vibration, and FIG. 9 shows right-and-left vibration. FIGS. 10 to 12 show data obtained by measurement with a hedge trimmer driven by a two-stroke internal combustion engine. In the hedge trimmer, the engine is mounted horizontally such that the axis of the cylinder bore extends in the front-to-rear direction. FIG. 10 shows up-and-down vibration, FIG. 11 shows front-and-rear vibration, and FIG. 12 shows right-and-left vibration. Note that the detected front-and-rear vibration shown in FIG. 11 includes normal engine vibration.

With reference to FIGS. 7 to 9 showing data of the chain saw and FIGS. 10 to 12 showing data of the hedge trimmer, the vibration exhibits peaks in the range of frequencies higher than about 100 Hz, but the vibration exhibits no peak in the range of frequencies lower than about 100 Hz.

The Inventors remarked and analyzed in detail the phenomenon that the acceleration due to the vibration and posture change inherent to the nature of the work apparatus and its intended function includes peaks in a limited range of frequencies while including no peaks in a specific frequency range, that is, the lower frequency range in the examples shown in FIGS. 1 to 12. Through these researches, the Inventors of the present invention could reach the present invention.

It is therefore an object of the invention to provide a work apparatus having a safety device capable of detecting any unexpected unsafe condition by an acceleration sensor while diminishing the effect of the acceleration caused by the vibration and posture change inherent to the nature of the work apparatus and its normal intended operation.

SUMMARY OF THE INVENTION

Shock waves appearing in particular situations likely to invite unexpected, sudden dangers, such as kickbacks, falling, and the like, belong to a relatively low frequency range. On the other hand, the above-explained vibration (acceleration) exhibits acceleration peaks inherent to the nature of the work apparatus and its intended normal operation in a relatively high frequency range as explained with reference to FIG. 1.

Taking this phenomenon into account, the present invention is directed to a work apparatus exhibiting acceleration appearing in conditions likely to invite an unexpected, sudden danger in a first frequency while exhibiting acceleration peaks inherent to the own nature of the work apparatus and its regular operation in a second frequency range that is out of the first frequency range. The present invention is characterized in controlling activation of the safety device by classifying acceleration information including frequency components detected by an acceleration sensor into the first and second frequency ranges, searching out an acceleration peak from the acceleration information in the first frequency range, and comparing the acceleration peak with a threshold. Therefore, it is possible to detect a condition likely to invite an unexpected, sudden danger by diminishing influence of vibration and posture change inherent to the own nature of the work apparatus and its intended operation.

According to a first aspect of the present invention, there is provided a work apparatus in which a cutting tool included therein is stopped from moving when it is determined based on acceleration information received from an acceleration sensor that there is the possibility of an unexpected unsafe condition, said work apparatus being equipped with a safety device comprising:

an acceleration sensor provided in said work apparatus;

an acceleration peak computation means supplied with acceleration information from said acceleration sensor and finding out a peak of acceleration included in said acceleration information;

a frequency range judgment means for judging whether or not the acceleration peak found out by the acceleration peak computation means is within a first frequency range in which an acceleration peak appears in a condition possibly inviting an unexpected, unsafe situation;

a comparison means for comparing said acceleration peak with a threshold when the frequency range judgment means judges that the acceleration peak is within the first frequency range; and an output means for issuing a safety signal to a disabling means when the comparison by the comparison means results in determining that the acceleration peak is higher than the threshold, said safety signal being applied to a disabling means that disables directly or indirectly the cutting tool of the work apparatus to stop movement thereof.

When the acceleration peak is determined to be within the first frequency range by the frequency range judgment means, the acceleration peak may be amplified such that the amplified value of the acceleration peak is compared with the threshold by the comparison means.

According to a second aspect of the present invention, there is provided a work apparatus including a cutting tool and equipped with a safety device for stopping motion of the cutting tool upon detection of a particular phenomenon possibly inviting an unexpected, unsafe situation from acceleration information received from an acceleration sensor, comprising:

an acceleration sensor mounted on the work apparatus;

a filtering means supplied with acceleration information from said acceleration sensor and extracting, from the frequency of the acceleration included in the acceleration information, information on acceleration in a first frequency range in which acceleration peaks indicative of phenomena possibly inviting any unexpected, unsafe situations normally appear while excluding acceleration information in a second frequency range in which acceleration peaks caused by vibration inherent to the own nature of said work apparatus or intended regular operation of the work apparatus appear;

an arithmetic operation means for executing arithmetic operation of the extracted acceleration information in said first frequency to find out an acceleration peak;

a comparison means for comparing the acceleration peak found out by said arithmetic operation means with a threshold; and an output means for issuing a safety signal to a disabling means when the result of comparison by said comparison means indicates that the acceleration peak is higher than the threshold, said disabling means responsively disabling said cutting tool of said work apparatus directly or indirectly to stop the cutting tool from moving.

Before the acceleration peak determined by the acceleration peak computation means is compared with the threshold, the acceleration peak may be amplified such that the amplified value of the acceleration peak is compared with the threshold by the comparison means.

According to a third aspect of the present invention, there is provided a work apparatus including a cutting tool and equipped with a safety device for stopping motion of the cutting tool upon detection of a particular phenomenon possibly inviting an unexpected, unsafe situation from acceleration information received from an acceleration sensor, comprising:

an internal combustion engine mounted in a drive unit in which a drive source for driving said cutting tool is provided;

an acceleration sensor attached to said drive unit in such an orientation that a detection axis of said acceleration sensor extends aslant from an axial line of a cylinder bore of said internal combustion engine;

an arithmetic operation means supplied with acceleration information from said acceleration sensor and executing arithmetic operation of the acceleration information to find out an acceleration peak;

a frequency range judgment means for judging whether or not the acceleration peak found out by said arithmetic operation means is within a first frequency range in which acceleration peaks indicative of phenomena possibly inviting any unexpected, unsafe situations normally appear;

an amplification means for amplifying the acceleration peak in the first frequency range when the frequency range judgment means determines that the frequency of the acceleration peak is in the first frequency range;

a first comparison means for comparing the acceleration peak amplified by the amplification means with a first threshold;

a second comparison means for comparing the acceleration peak with a second threshold when the frequency range judgment means determines that the frequency of the acceleration peak is in a frequency out of the first frequency range; and an output means for issuing a safety signal to a disabling means when comparison of said first comparison means results in determining that the acceleration peak in the first frequency range is equal to or higher than the first threshold or when comparison of said second comparison means results in determining that the acceleration peak in the acceleration peak in the frequency range out of the first frequency range is equal to or higher than the second threshold, said disabling means responsively disabling said cutting tool of said work apparatus directly or indirectly to stop the cutting tool from moving.

According to the third aspect of the present invention, when it is detected based on the result of comparison with the second threshold that a trouble has occurred with the cutting tool, the motion of the cutting tool can be stopped. More particularly, the third aspect is applicable to a brush cutter. If the disk-shaped cutting blade becomes out of balance while the brush cutter is being used, it is possible to detect the irregularity and stop the cutting blade immediately from rotating.

According to a fourth aspect of the present invention, there is provided a work apparatus including a cutting tool and equipped with a safety device for stopping motion of the cutting tool upon detection of a particular phenomenon possibly inviting an unexpected, unsafe situation from acceleration information received from an acceleration sensor, comprising:

an internal combustion engine mounted in a drive unit in which a drive source for driving said cutting tool is provided;

an acceleration sensor attached to said drive unit in such an orientation that a detection axis of said acceleration sensor extends aslant from an axial line of a cylinder bore of said internal combustion engine;

a frequency range judgment means supplied with acceleration information from said acceleration sensor and judging whether an acceleration indicated by the acceleration information has a frequency in a first frequency range in which acceleration peaks indicative of phenomena possibly inviting any unexpected, unsafe situations normally appear or in a frequency range other than the first frequency range;

a first arithmetic operation means for executing arithmetic operation of the acceleration having the frequency in the first frequency range to find out an acceleration peak;

an amplification means for amplifying the acceleration peak found out from the acceleration having the frequency in the first frequency range;

a second arithmetic operation means for executing arithmetic operation of the acceleration having a frequency in the frequency range other than the first frequency range to find out an acceleration peak;

a first comparison means for comparing the acceleration peak in the first frequency range amplified by the amplification means with a first threshold;

a second comparison means for comparing the acceleration peak in the frequency range other than the first frequency range, which has been found out by the second arithmetic operation means, with a second threshold;

an output means for issuing a safety signal to a disabling means when comparison of said first comparison means results in determining that the acceleration peak in the first frequency range is equal to or higher than the first threshold or when comparison of said second comparison means results in determining that the acceleration peak in the acceleration peak in the frequency range out of the first frequency range is equal to or higher than the second threshold, said disabling means responsively disabling said cutting tool of said work apparatus directly or indirectly to stop the cutting tool from moving.

According to the fourth aspect of the present invention, when it is detected based on the result of comparison with the second threshold that a trouble has occurred with the cutting tool, the cutting tool can be stopped from moving. More particularly, the fourth aspect is applicable to a brush cutter. If the disk-shaped cutting blade becomes unbalanced while the brush cutter is being used, the abnormality can be detected and the cutting blade be immediately stopped from rotating.

The foregoing and other features, aspects and advantages of the present invention will be apparent from the following detailed description of the present invention when taken in conjunction with the accompanying drawings.

DETAILED DESCRIPTION OF THE INVENTION

The present invention is described in detail below concerning the embodiments thereof with reference to the accompanying drawings.

Figure 13:
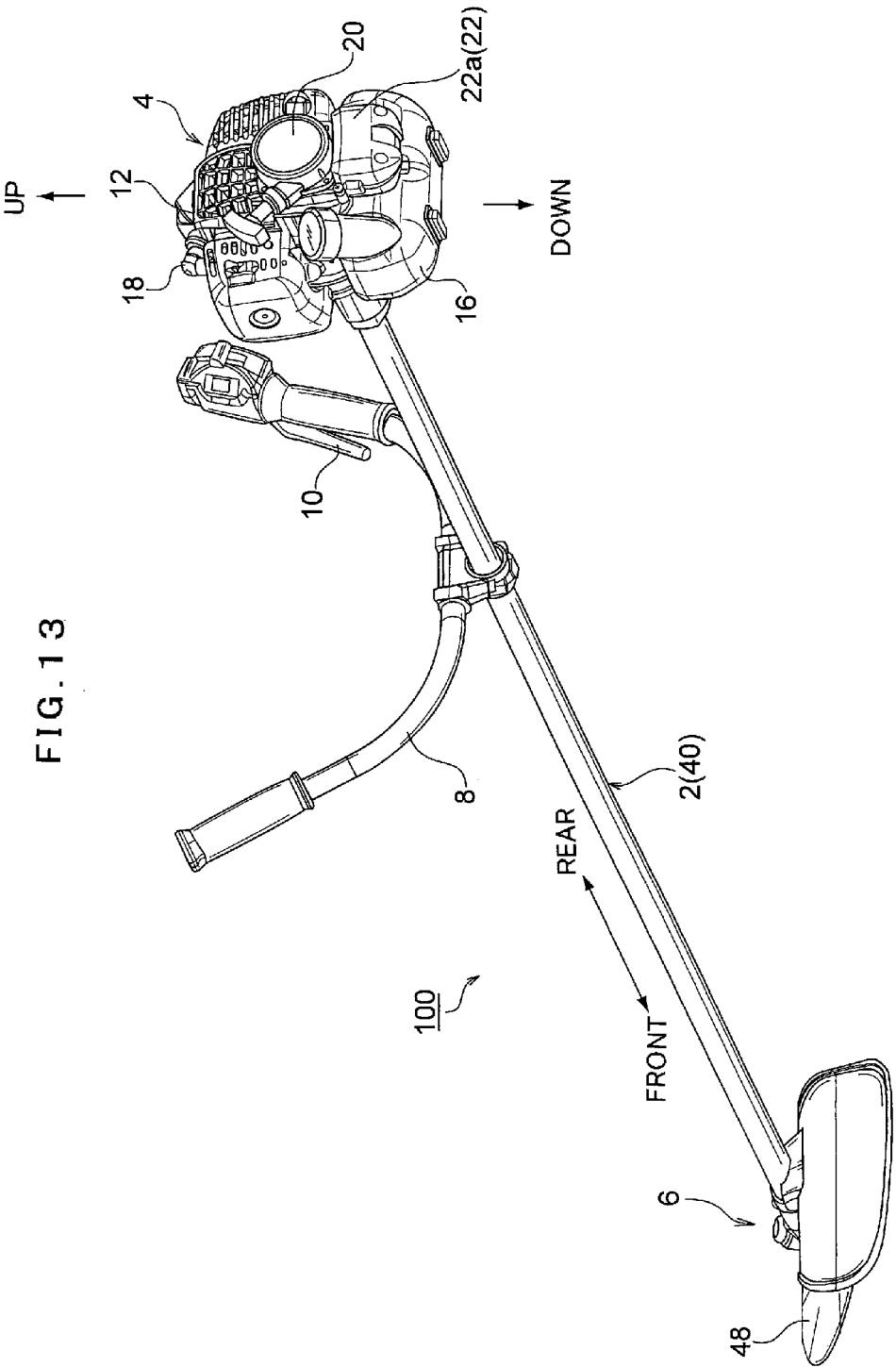
FIG. 13 is a perspective view of a shoulder-strap type brush cutter according to an embodiment of the present invention.
Figure 14:
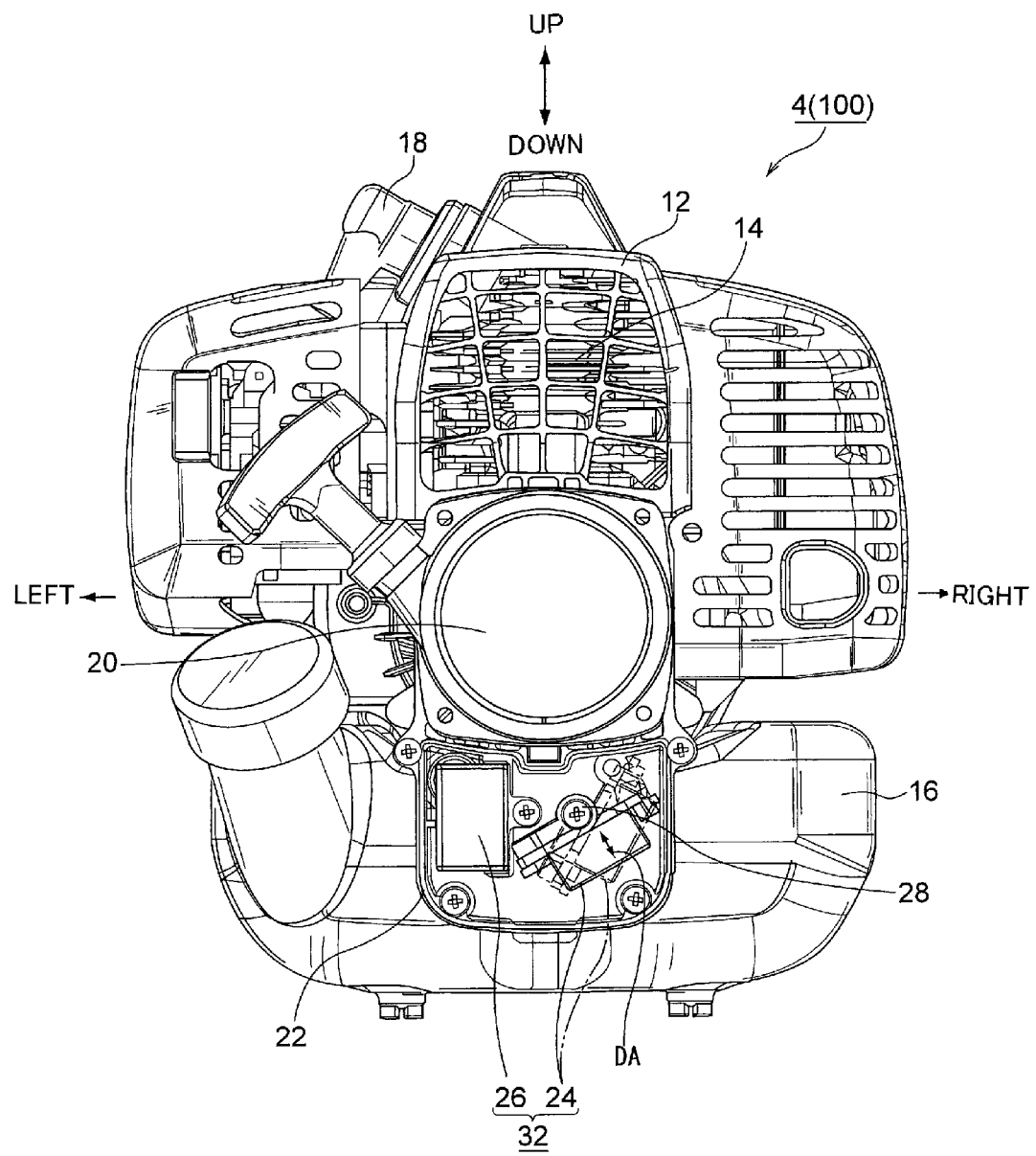
FIG. 14 is a rear view of a drive source of the brush cutter.

FIGS. 13 and 14 show a shoulder-strap type brush cutter according to an embodiment of the present invention. FIG. 13 is a perspective view of the brush cutter. The brush cutter is denoted by reference numeral 100. As shown, it includes a manipulation tube 2, a drive unit 4 provided at one end or a proximal end of the manipulation tube 2, and a cutting unit 6 provided at the other end or a distal end of the manipulation tube 2. The manipulation tube 2 has a handle 8 provided at the lengthwise middle portion thereof. The above construction is well known. The handle 8 has a throttle lever 10 etc. provided thereon. By operating the throttle lever 10, the worker can adjust the speed of operation of the cutting unit 6.

The drive unit 4 includes an air-cooled single-cylinder two-stroke internal combustion engine 14 (as in FIG. 14) covered with an engine cover 12, and a fuel tank 16 disposed adjacent to and under the engine 14. The engine 14 runs using the fuel supplied from the fuel tank 16. The single-cylinder internal combustion engine 14 is installed in the drive unit 4 with the axis of a cylinder bore thereof being extended vertically. In FIGS. 13 and 14, reference numeral 18 indicates an ignition plug. The ignition plug 18 is affixed to the top of the engine 14. Also, the reference numeral 20 indicates a recoil starter. The recoil starter 20 is mounted on the back of the drive unit 4 to project rearward. By operating the recoil starter 20, the engine 14 can be started. A shock pickup box 22 is disposed in a dead space located under the recoil starter 20 and at the back of the fuel tank 16.

FIG. 14 is a view of the brush cutter 100 from the rear end face thereof, namely, from the side opposite to the cutting unit 6. In FIG. 14, the shock detection box 22 is shown with a cover 22a thereof detached. The shock pickup box 22 has provided therein an acceleration sensor 24 and a controller 26 that employs a micro computer.

According to this embodiment, the acceleration sensor 24 uses a piezoelectric sensor. The piezoelectric sensor has a pickup made of a piezoelectric ceramic attached on a thin disk-shaped metallic sheet. The pickup has a single detection axis. Of course, a semiconductor sensor may be adopted as the acceleration sensor. The semiconductor sensor is typically a piezoelectric element type sensor. Well-known semiconductor sensors include a uniaxial type having a single detection axis, biaxial type having two axes of detection, and a triaxial type having three axes of detection. According to this embodiment, any one of these uniaxial, biaxial and triaxial types may be used as the acceleration sensor. However, the uniaxial-axial type acceleration sensor is adopted in the present invention because it advantageously permits to simplify the processes in the controller 26.

Figure 15:
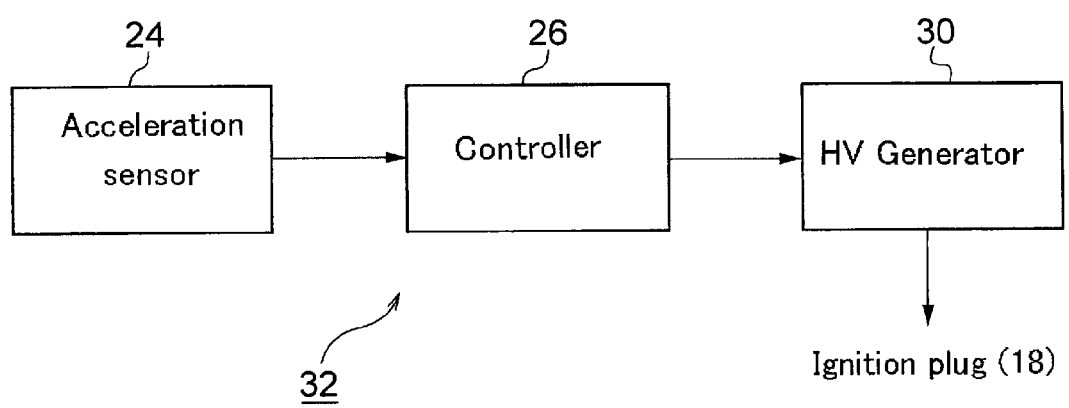
FIG. 15 is a schematic block diagram of a safety device using an acceleration sensor and an object to be controlled by the safety device.

The work apparatus according to this embodiment includes a safety device 32 including the acceleration sensor 24, controller 26 and a high voltage (HV) generation circuit 30 that applies a high voltage to the ignition plug 18 as schematically illustrated in FIG. 15. The acceleration sensor 24 provides the controller 26 with acceleration information including frequency components. The controller 26 processes the acceleration information as will be described later to issue a safety signal when predetermined requirements are met. The safety signal is supplied to the HV generation circuit 30 that applies a high voltage to the ignition plug 18. Receiving the safety signal, the HV generation circuit 30 is disabled from generating the high voltage that is to be applied to the ignition plug 18. More specifically, the safety signal issued from the controller 26 stops energizing the primary coil of the HV generation circuit 30. Thus, application of the high voltage to the ignition plug 18 is stopped. As the result, the engine 14 is stopped. Thus, the cutting unit 6 is disabled from rotating the cutting blade 48. According to this embodiment, the safety mechanism is so arranged that the engine 14 be stopped to disable the cutting unit 6 from rotating the cutting blade 48. However, the present invention is not limited to this arrangement but a brake mechanism may be additionally provided to stop the cutting blade 48 forcibly, while stopping the engine 14.

Figure 16:
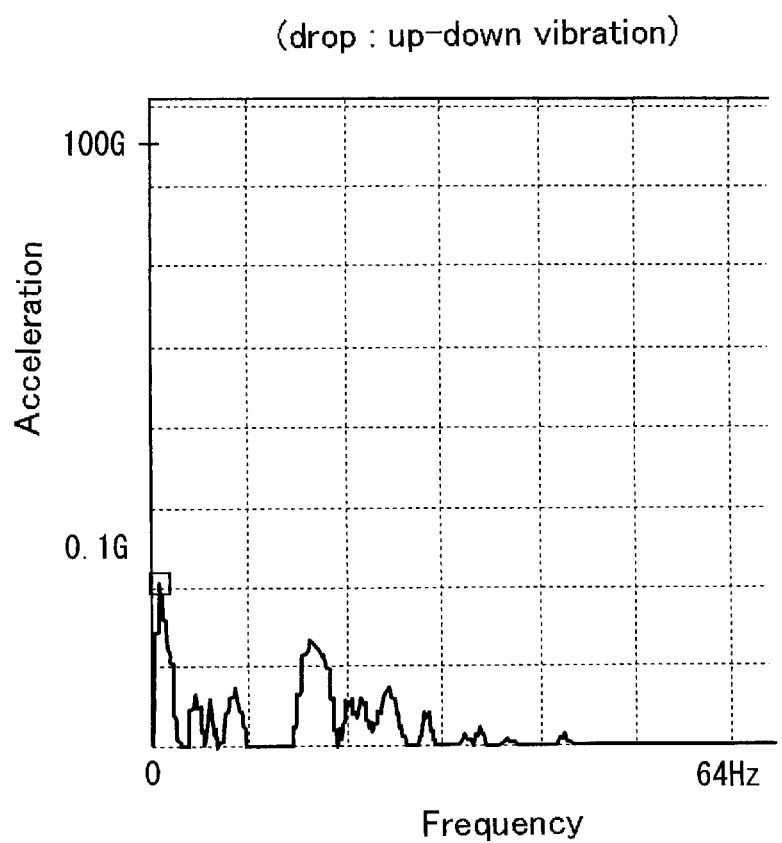
FIG. 16 shows up-and-down vibration detected on the brush cutter when fallen.
Figure 17:
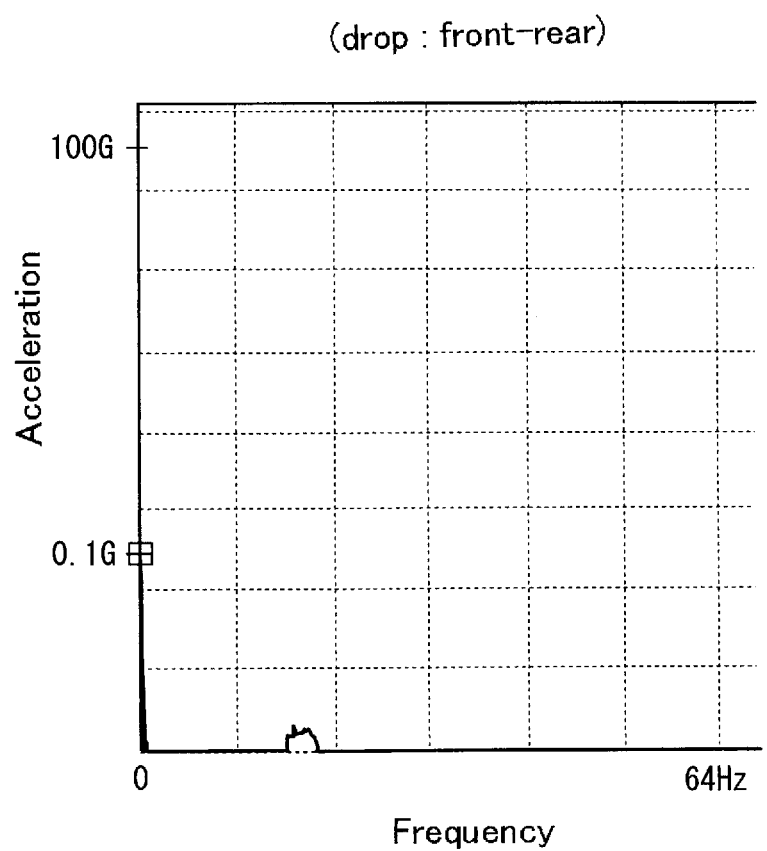
FIG. 17 shows front-and-rear vibration detected on the brush cutter when fallen.
Figure 18:
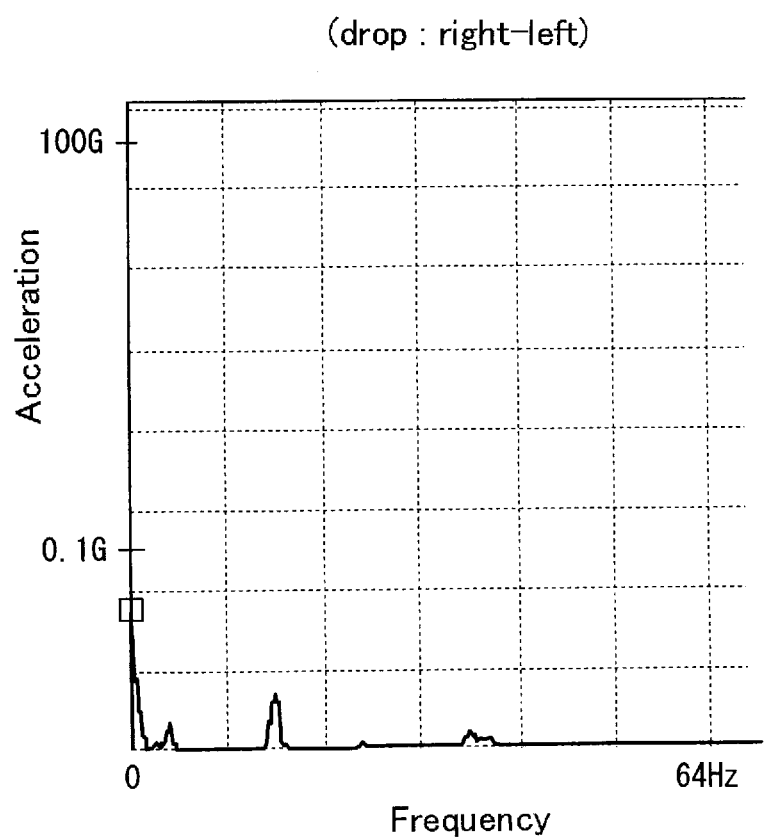
FIG. 18 shows right-and-left vibration detected on the brush cutter when fallen.
Figure 19:
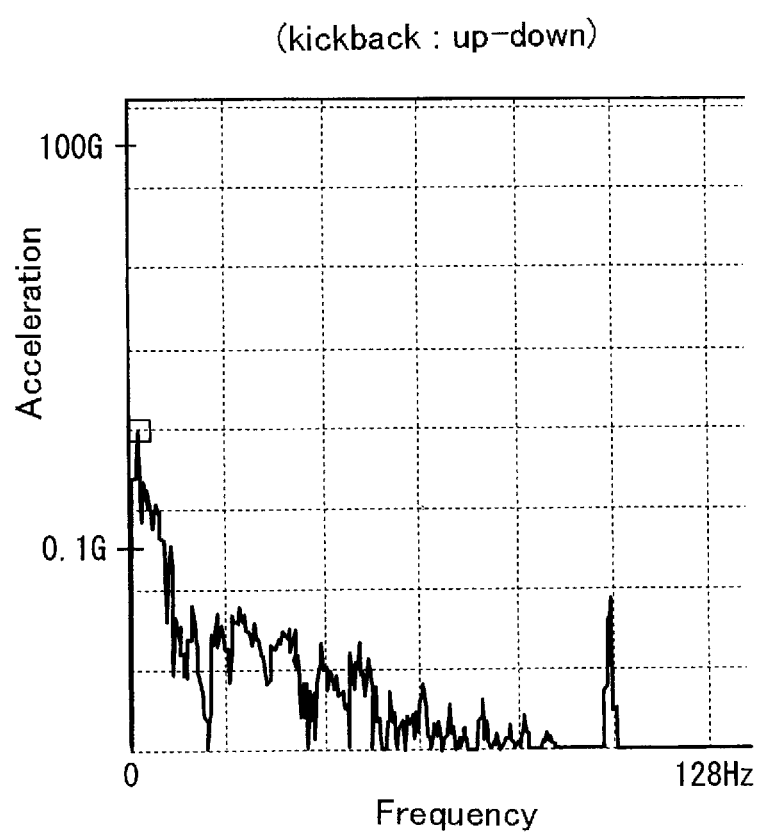
FIG. 19 shows up-and-down vibration detected on the brush cutter when intentionally kicked back.
Figure 20:
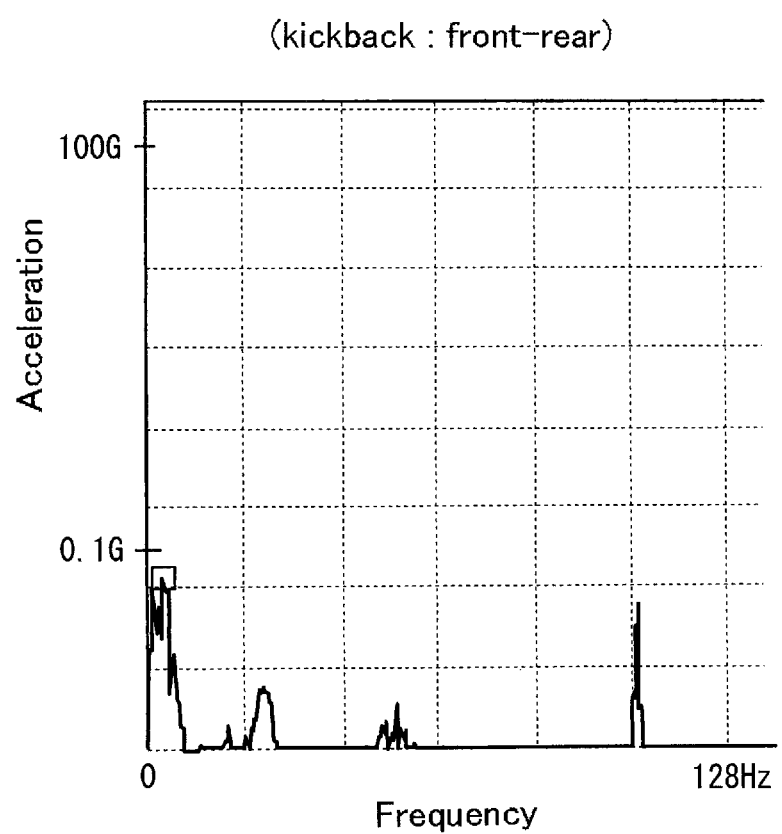
FIG. 20 shows front-and-rear vibration detected on the brush cutter when intentionally kicked back.
Figure 21:
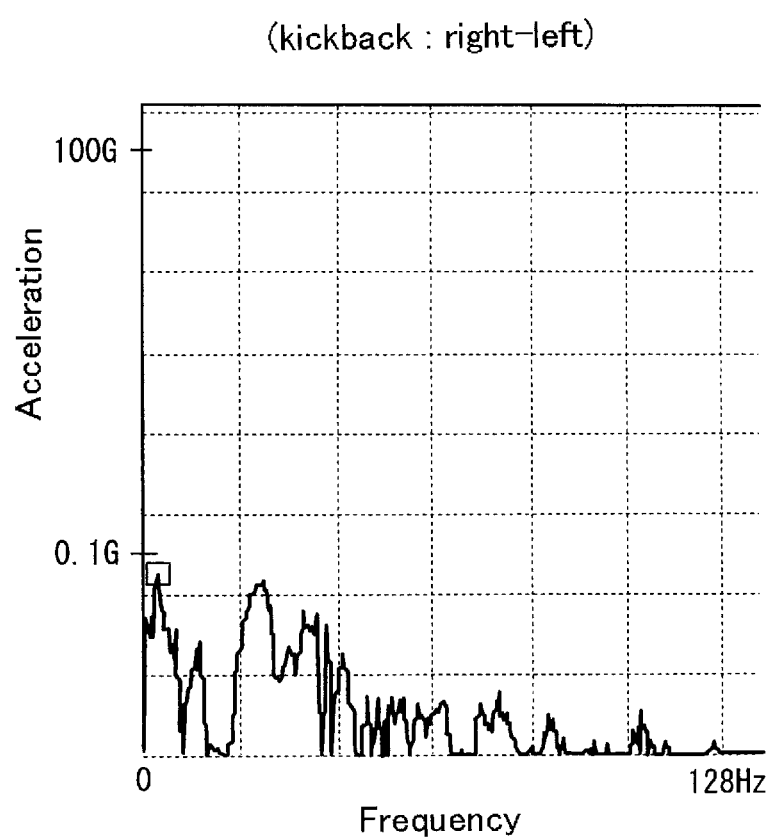
FIG. 21 shows right-and-left vibration detected on the brush cutter when intentionally kicked back.

FIGS. 16 to 18 show up-and-down vibration (FIG. 16), front-and-rear vibration (FIG. 17) and right-and-left vibration (FIG. 18), detected when the brush cutter 100 was dropped on trial base in the experiments. FIGS. 19 to 21 show up-and-down vibration (FIG. 19), front-and-rear vibration (FIG. 20) and right-and-left vibration (FIG. 21), detected when the brush cutter 100 was intentionally hit against a log and kicked back. The square mark in each of FIGS. 16 to 18 indicates a highest acceleration peak. As will be known from FIGS. 16 to 18, the acceleration shows a peak in a range of considerably low frequencies among frequencies lower than 100 Hz.

Figure 22:
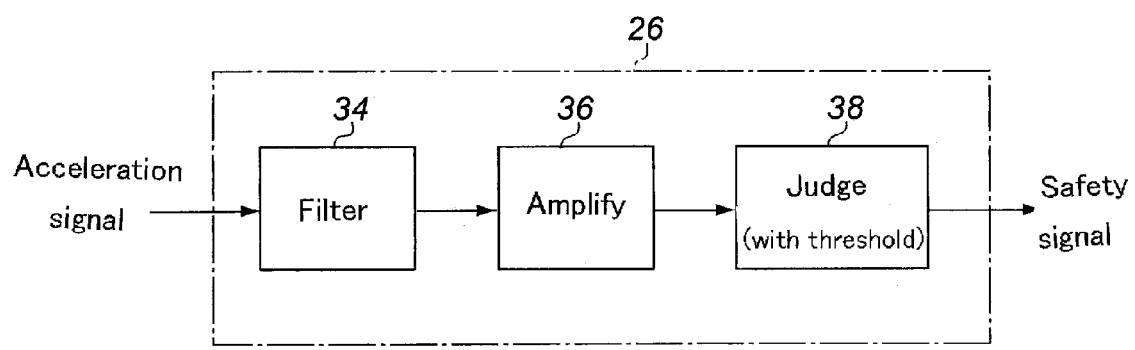
FIG. 22 is a schematic block diagram for explanation of the process done by the controller shown in FIG. 15.

As shown in FIG. 22, the controller 26 includes a filtering means 34, preferably, an amplification means 36 and a judgment means 38. An example of a series of operations done by the controller 26 is explained below with reference to FIG. 23.

Figure 23:
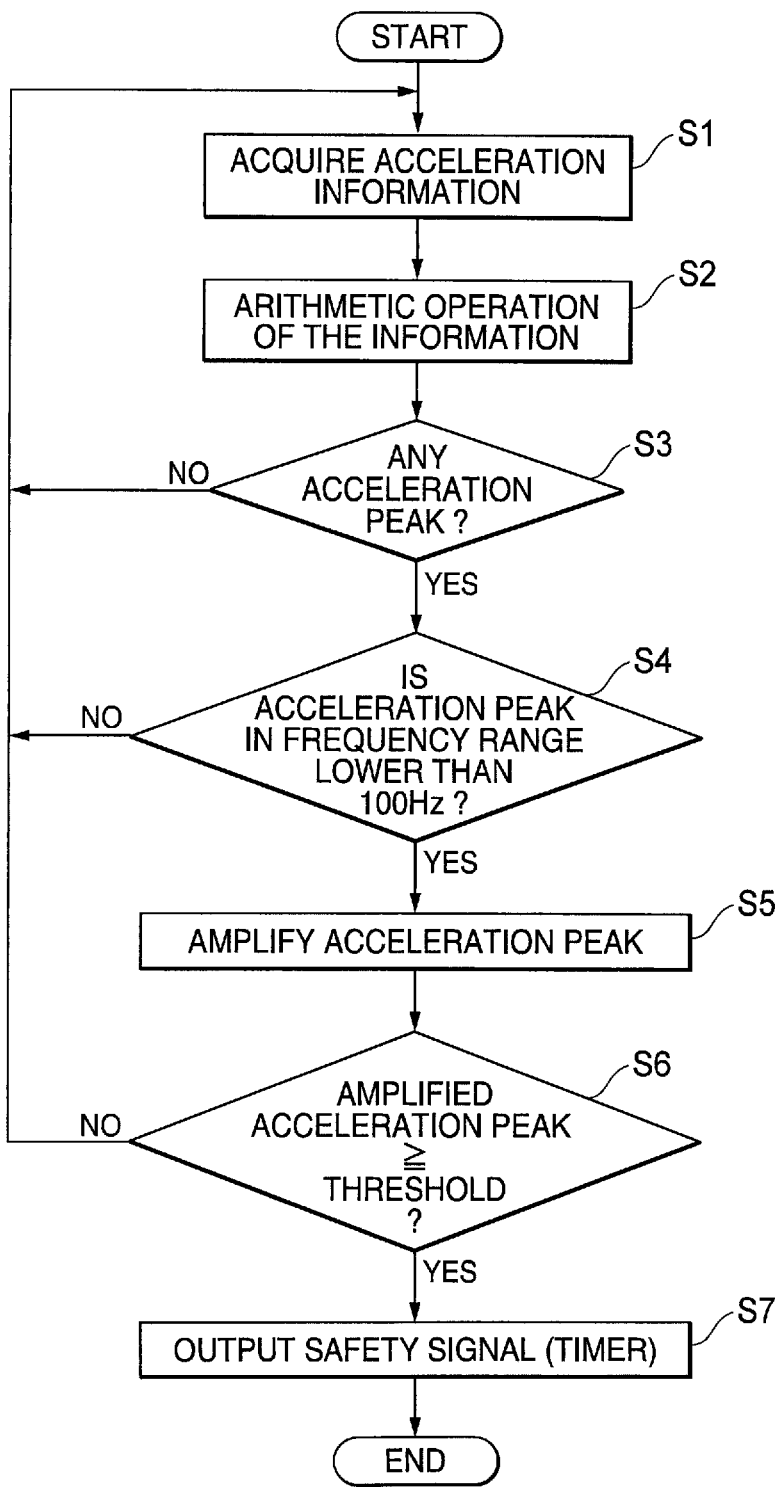
FIG. 23 shows, as an example, a flow of operations done by the controller included in the safety device in which the acceleration sensor is adopted.

As shown in FIG. 23, acceleration information including frequency components supplied from the acceleration sensor 24 is supplied to the controller 26 in step S1. In step S2 next to step S1, an acceleration peak is determined by computation based on the acceleration information supplied to the controller 26 in step S1. Then in step S3, it is judged whether an acceleration peak exists or not. If it is determined in step S3 that there exists no acceleration peak (the negative result is indicated with "NO" in the flow chart), the controller 26 will return to step S1. On the other hand, when it is determined in step S3 that there exists an acceleration peak (the affirmative result is indicated with "YES" in the flow chart), the controller 26 proceeds to step S4 in which it is judged whether or not the acceleration peak exists in a range of frequencies lower than 100 Hz. If the result of judgment in step S4 is negative (NO), namely, if it is determined that the acceleration peak exists in a range of frequencies higher than 100 Hz, the controller 26 returns to step S1. Namely, the acceleration peak in the range of frequencies higher than 100 Hz is filtered out. On the other hand, when the result of judgment in step S4 is affirmative (YES), namely, if it is determined that the acceleration peak exists in a range of frequencies lower than 100 Hz, the controller 26 proceeds to step S5 in which the acceleration peak is amplified. In next step S6, the acceleration peak thus amplified is compared in value with a threshold. When the acceleration peak is found higher than the threshold as the result of comparison in step S6, the controller 26 proceeds to step S7 in which a safety signal is generated and issued from the controller 26. The safety signal should preferably be issued continuously for a fixed time (of 5 sec, for example) set in a timer. It should be noted here that if it is determined in step S5 that the amplified acceleration peak is lower than the threshold, the controller 26 will return to step S1.

Note that the fixed time set in the timer is not limited to 5 sec so long as it meets the following requirements. Namely, after the application of the high voltage to the ignition plug 18 of the engine 14, a time is set for which no high voltage is applied to the ignition plug 18 while the engine is holding inertia. For example, in case the timer is set for a time of 2 to 3 sec, the engine 14 will possibly be restarted if the ignition plug 18 is applied again with the high voltage immediately after the safety signal is issued for 2 to 3 sec. The engine 14 can be positively stopped by setting the timer for a time of about 5 sec or more, for example. With the above safety control, the supply of power to the primary coil of the HV generation circuit 30 is stopped immediately after reception of a shock detection signal from the acceleration sensor 24. By continuing the supply of no power to the primary coil for a fixed time, the engine 14 can be stopped completely.

Note that in a variant of the above embodiment, the amplification in step S5 may be omitted. Also in another variant, acceleration in the range of frequencies lower than 100 Hz may be amplified for subsequent determination of an acceleration peak in the range of frequencies lower than 100 Hz.

Figure 24:
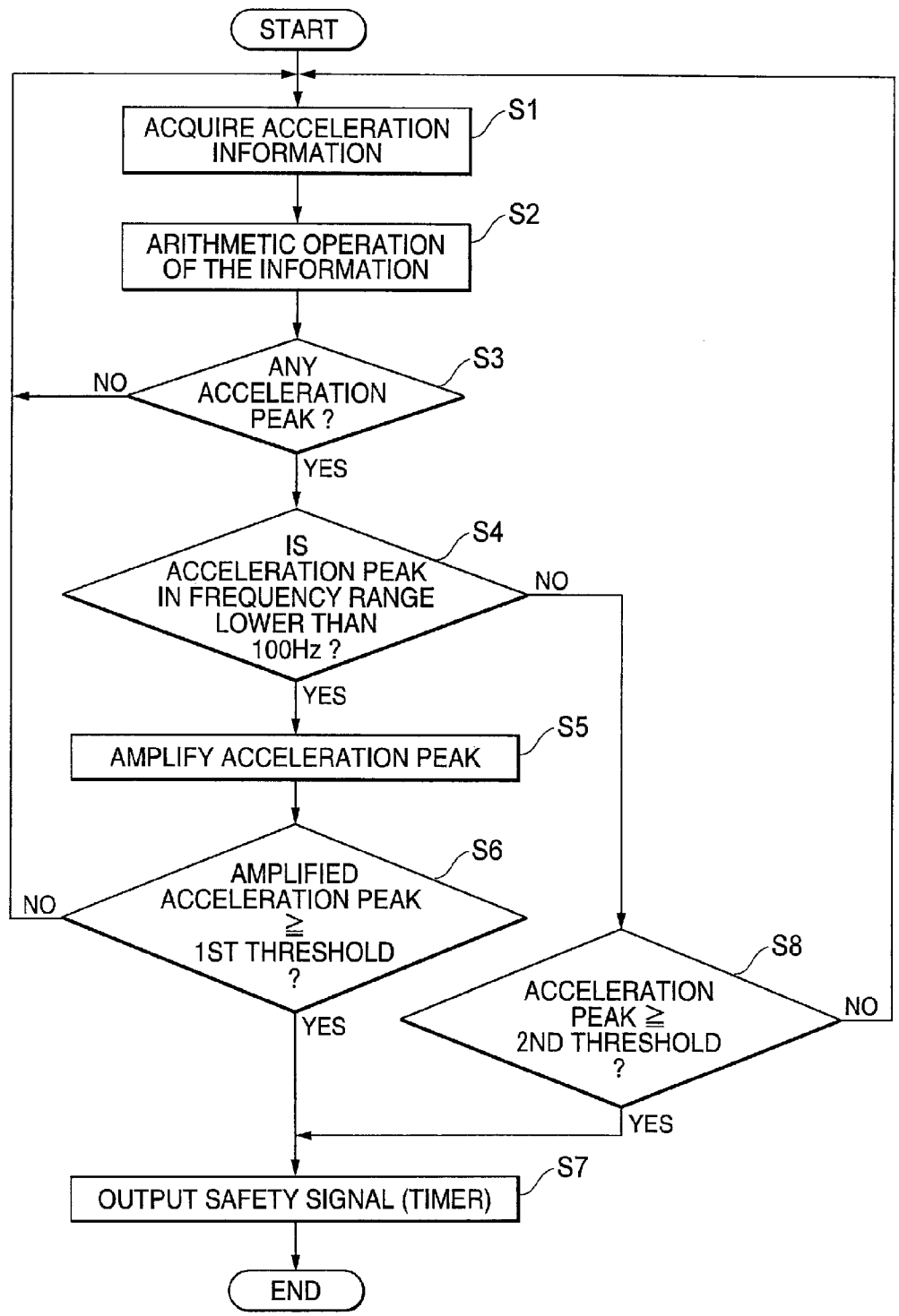
FIG. 24 shows a variant of the flow chart shown in FIG. 23, showing, as an example, operations done by the controller for providing safety control when the worker cannot control the brush cutter and forcibly stopping the cutting blade from rotating when the cutting blade becomes unbalanced.

FIG. 24 shows a variant of the flow chart in FIG. 23. In step S4 in the flow chart in FIG. 23, it is judged whether or not the acceleration peak exists in a range of considerably lower ones in a range of frequencies lower than 100 Hz, and if it is determined that the acceleration peak is in a range of frequencies higher than 100 Hz, the acceleration peak in the range of frequencies higher than 100 Hz is filtered out. If the result of judgment in step S4 is negative (NO), namely, if the acceleration peak exists in the range of frequencies higher than 100 Hz, the controller 26 proceeds to step S8 in which it is judged whether the acceleration peak in consideration are higher than a second threshold.

Figure 1:
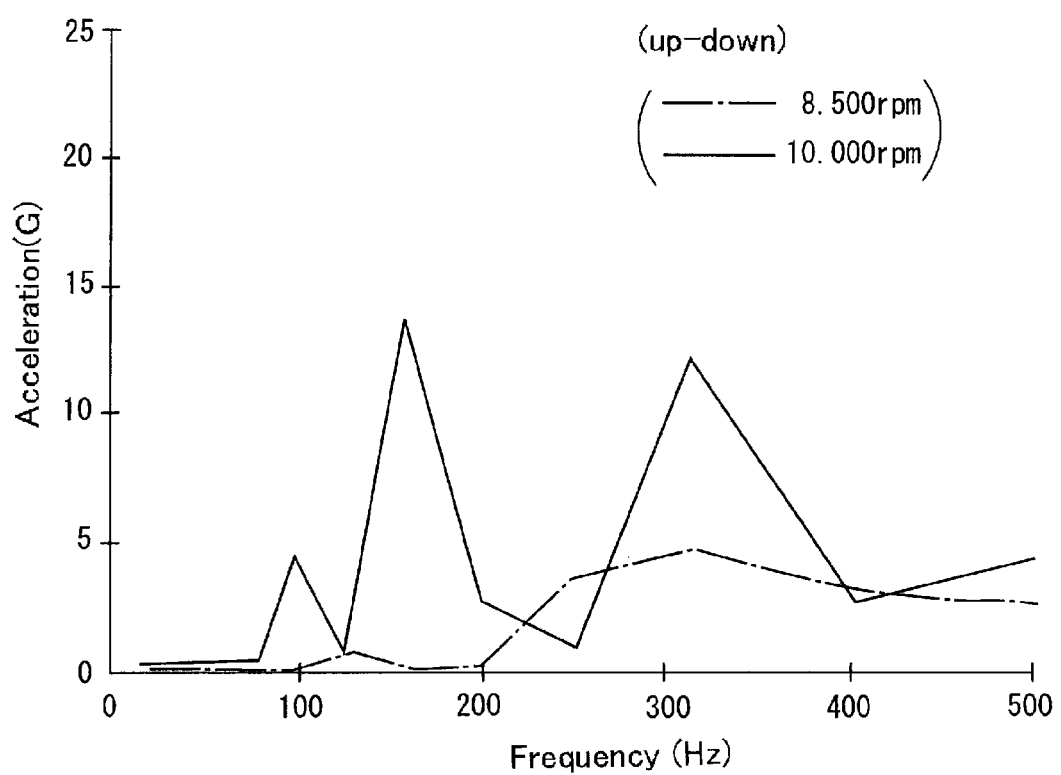
FIG. 1 shows up-and-down vibration detected on the drive source of a brush cutter driven by an internal combustion engine.
Figure 25:
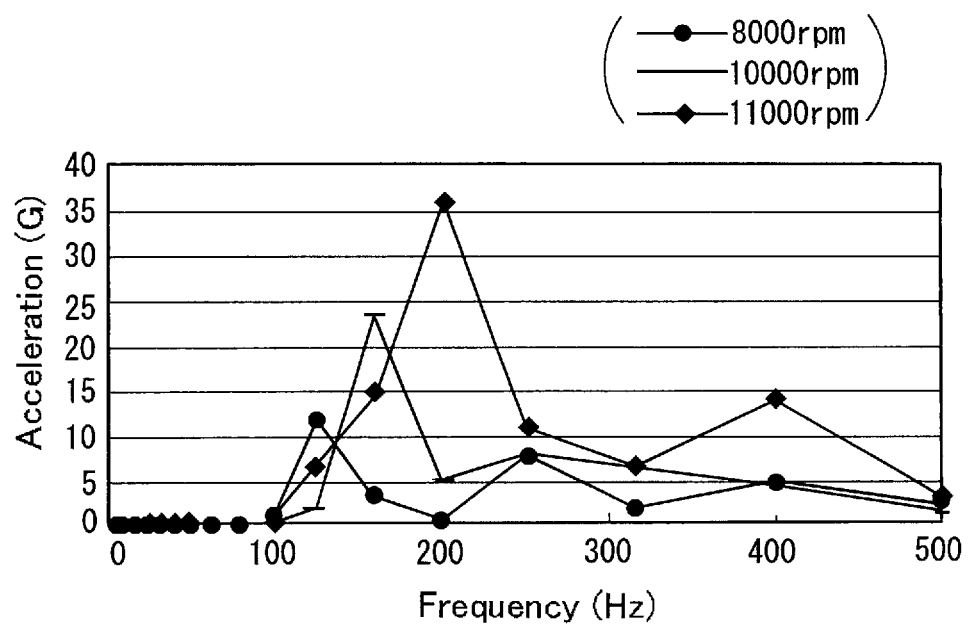
FIG. 25 shows up-and-down vibration detected on the drive source when the cutting blade of a brush cutter driven by an internal combustion engine is intentionally put in an unbalanced condition.
Figure 26:
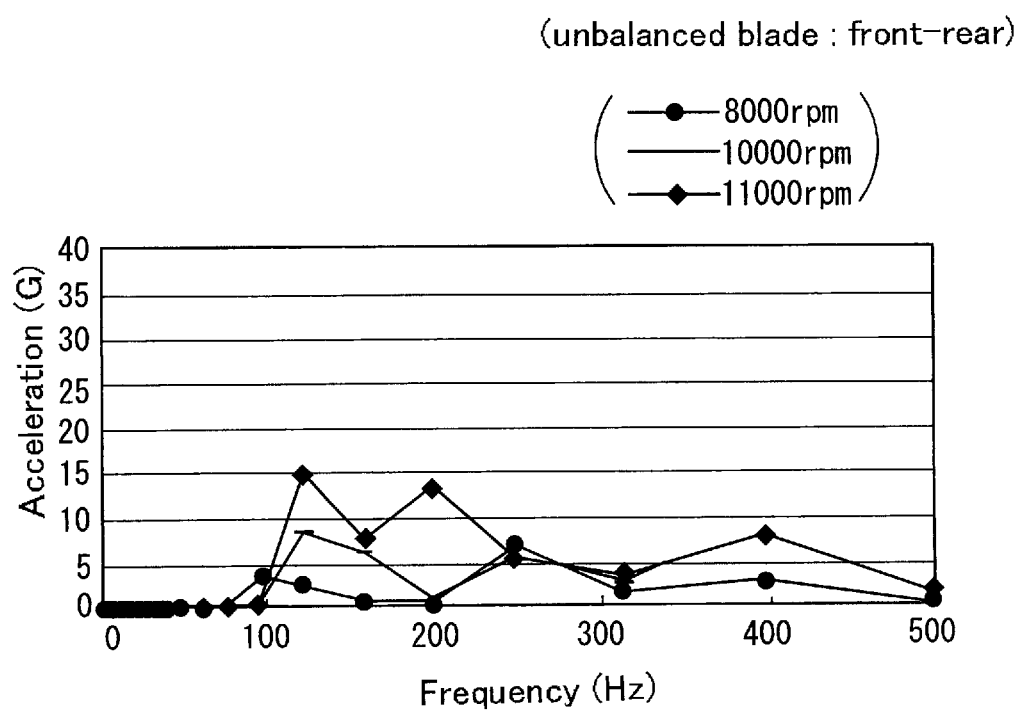
FIG. 26 shows front-and-rear vibration detected on the drive source when the cutting blade of the brush cutter driven by the internal combustion engine is intentionally put in an unbalanced condition.
Figure 27:
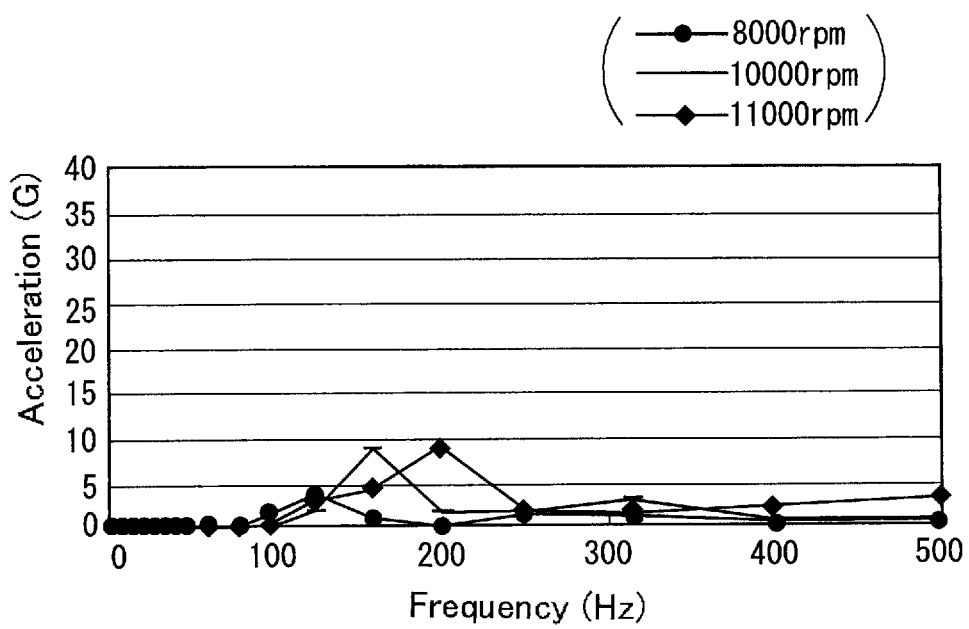
FIG. 27 shows right-and-left vibration detected on the drive source when the cutting blade of the brush cutter driven by the internal combustion engine is intentionally put in an unbalanced condition.

FIGS. 25 to 27 show up-and-down vibration (FIG. 25), front-and-rear vibration (FIG. 26) and right-and-left vibration (FIG. 27), measured with a weight of 5 grams (g) attached to the periphery of the cutting blade to intentionally unbalance the cutting blade circumferentially. In the up-and-down vibration shown in FIG. 25, an extremely high acceleration peak of about 35 G is found in a frequency range of about 200 Hz when the engine speed is 11,000 rpm. Also, the vibration-caused maximum acceleration detected when the cutting blade is out of balance while the engine is running at a speed of 10,000 rpm is about 24 G (in the frequency range of about 200 Hz). In contrast, the maximum peak of the acceleration due to the up-and-down vibration (engine vibration) shown in FIG. 1 is about 14 G. In step S8 in the flow chart given in FIG. 24, there is set as a second threshold an acceleration peak higher than the value of 14 G in FIG. 1 and lower than the value of 24 G (in FIG. 25) with the cutting blade unbalanced circumferentially. Thus, it is possible to detect the cutting blade unbalanced during working with the brush cutter.

When the result of judgment in step 8 is affirmative (YES), it is assumed that the cutting blade is unbalanced, and the controller 26 proceeds to step S7 in which it will issue a safety signal to stop the engine. As the result, the cutting blade 48 (in FIG. 28) is stopped from rotating. As an example other than the above safety mechanism of stopping the engine, there may be provided on a power transmission path to the cutting blade 48 a brake, which is a disabling means, namely, a safety means, which will forcibly stop, when applied, the cutting blade 48 from rotating.

In the above example, the acceleration sensor 24 is used as a means of firstly detecting that the worker has become unable to control the work apparatus kicked back or having fallen in any other trouble and secondly detecting that the cutting blade has been unbalanced. However, the acceleration sensor 24 may be used only for detecting the unbalanced cutting blade.

Figure 28:
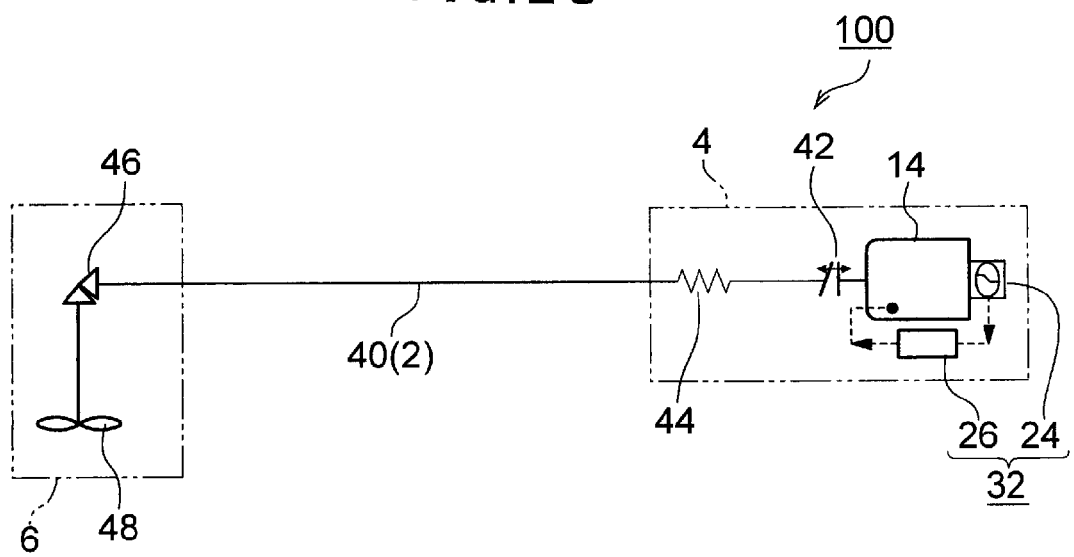
FIG. 28 shows a basic construction of the brush cutter in FIG. 13.

As in FIG. 28 showing a basic construction of the brush cutter 100, the engine 14 provided in the drive unit 4 delivers an output to the cutting unit 6 through a power transmission shaft 40 disposed in the manipulation tube 2. The drive unit 4 has a centrifugal clutch 42 and damper 44 provided between the engine 14 and power transmission shaft 40. Also, a bevel gear 46 is provided in the cutting unit 6 to couple the power transmission shaft 40 and disk-shaped cutting blade 48 to each other.

Owing to the aforementioned operations of the control 26, the HV generation circuit 30 (see FIG. 15) receives a safety signal from the controller 26 and stops the HV generation circuit 30 from generating a high voltage, thereby stopping the engine 14. Also, since the safety signal is continuously issued from the controller 26 for a time of about 5 sec, the HV generation circuit 30 is kept stopped for a predetermined time from generating the high voltage, whereby the engine 14 can be stopped positively.

In a variant of the series of operations done by the controller 26 shown in FIG. 23, there may be provided instead of the step S5 in which the amplification is made a step in which the acceleration peak is amplified before proceeding on to step S4 after it is determined in step S3 that there exists the acceleration peak.

Figure 2:
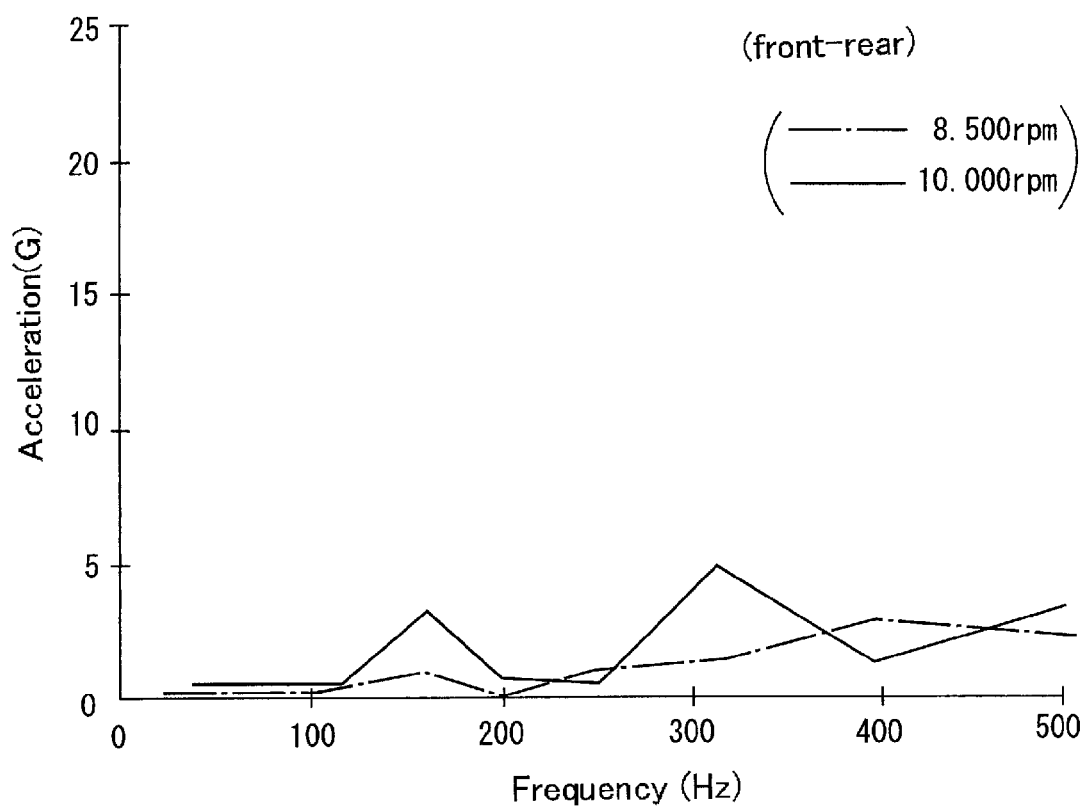
FIG. 2 shows front-and-rear vibration detected on the drive source of the brush cutter driven by the internal combustion engine.
Figure 3:
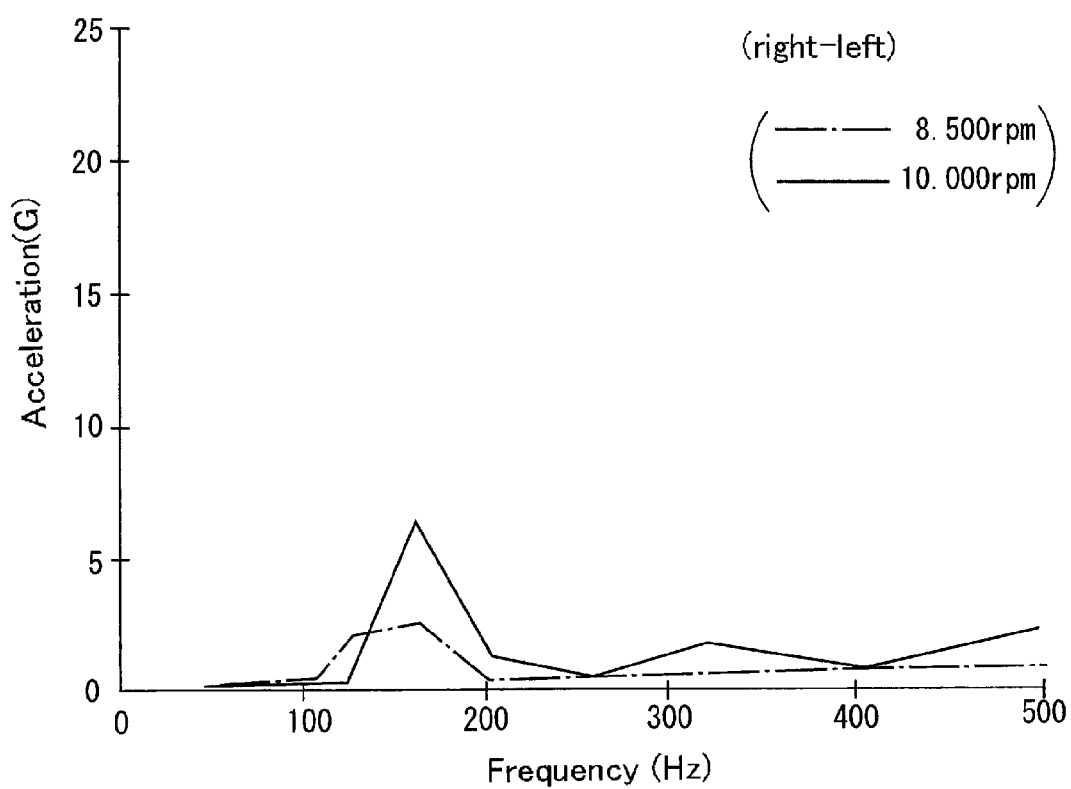
FIG. 3 shows right-and-left vibration detected on the drive source of the brush cutter driven by the internal combustion engine.
Figure 4:
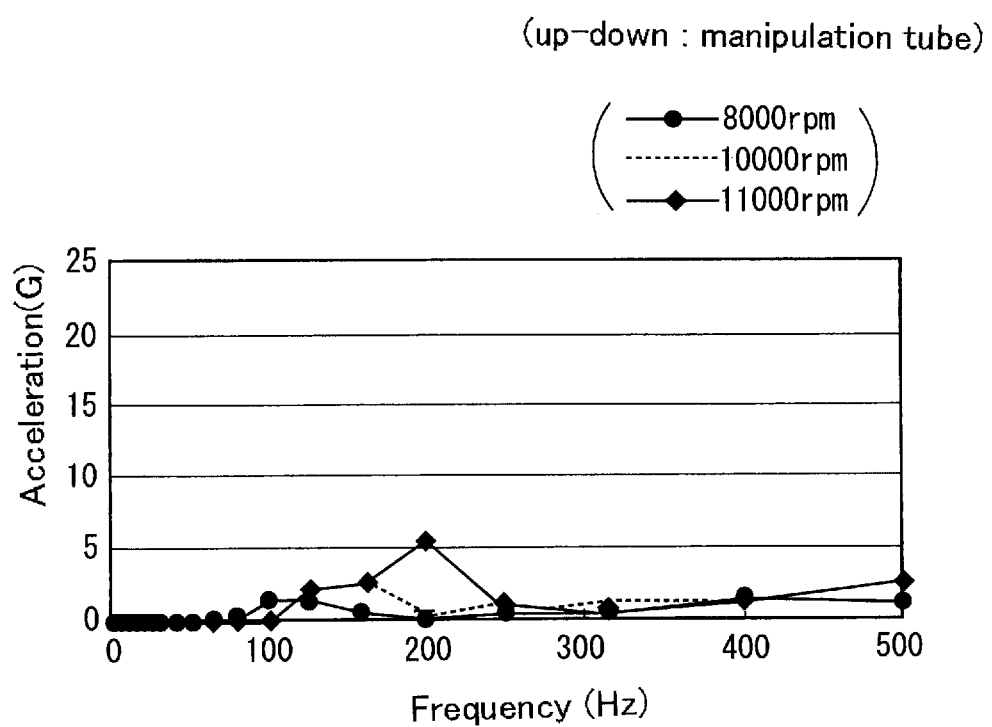
FIG. 4 shows up-and-down vibration detected on the end of a manipulation tube of a brush cutter driven by an internal combustion engine.
Figure 5:
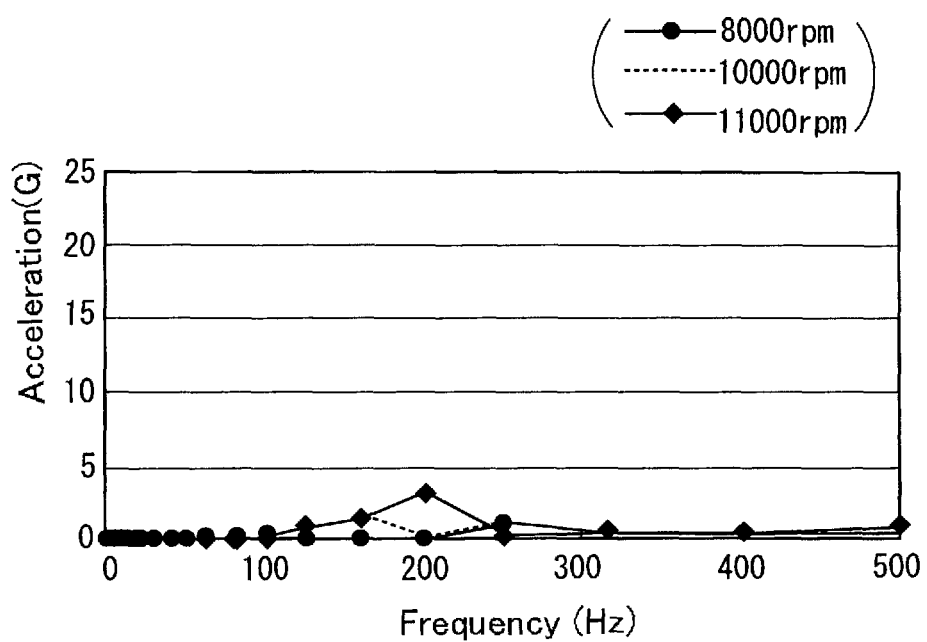
FIG. 5 shows front-and-rear vibration detected on the end of a manipulation tube of a brush cutter driven by an internal combustion engine.
Figure 6:
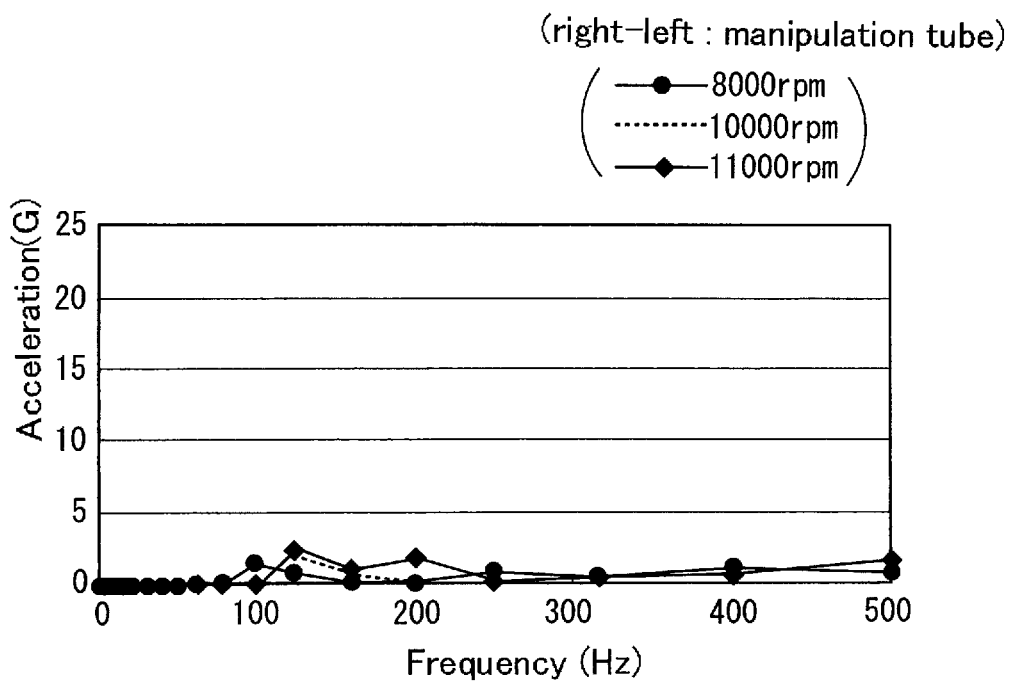
FIG. 6 shows right-and-left vibration detected on the end of a manipulation tube of a brush cutter driven by an internal combustion engine.
Figure 7:
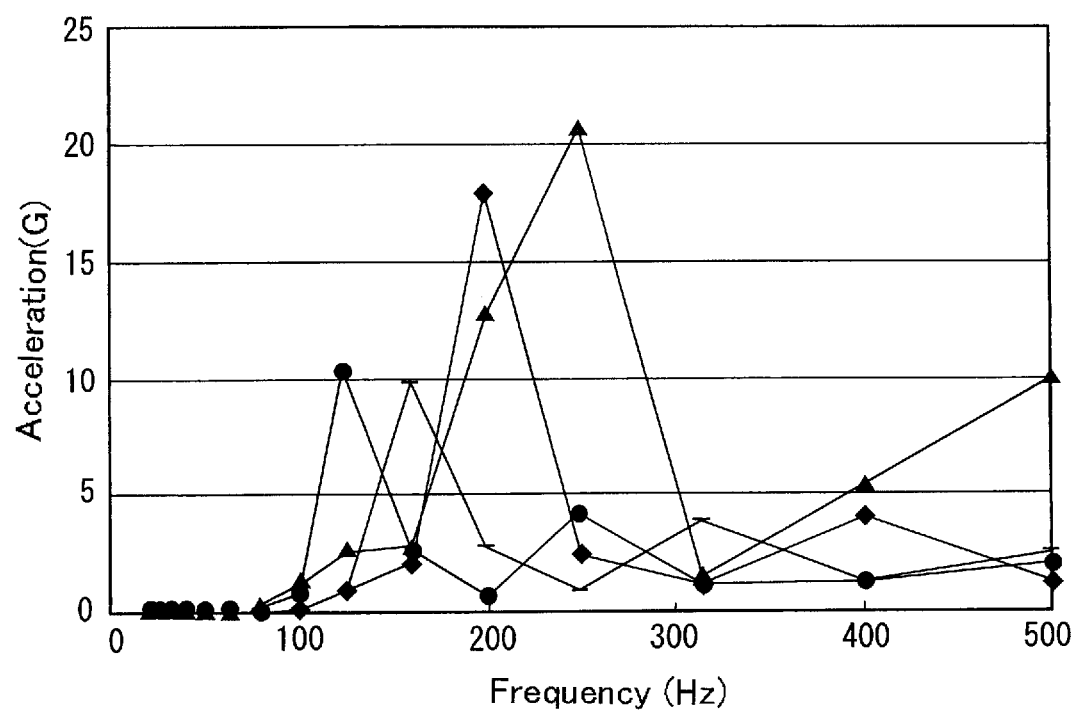
FIG. 7 shows up-and-down vibration detected on the drive source of a chain saw driven by an internal combustion engine.
Figure 8:
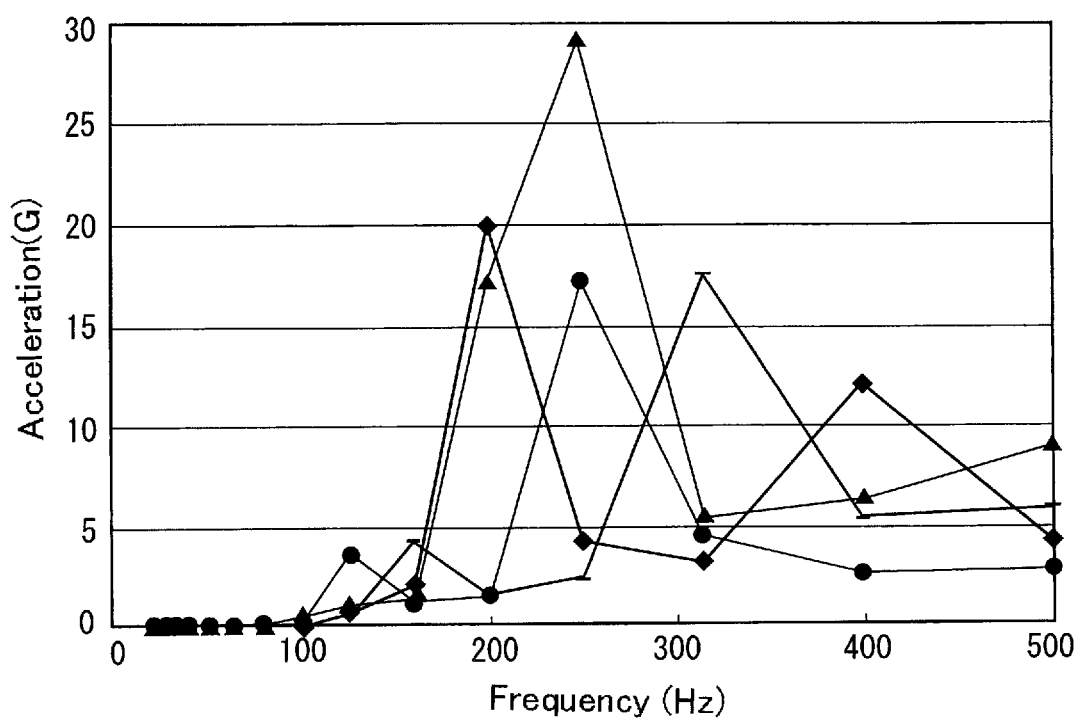
FIG. 8 shows front-and-rear vibration detected on the drive source of the chain saw driven by the internal combustion engine.
Figure 9:
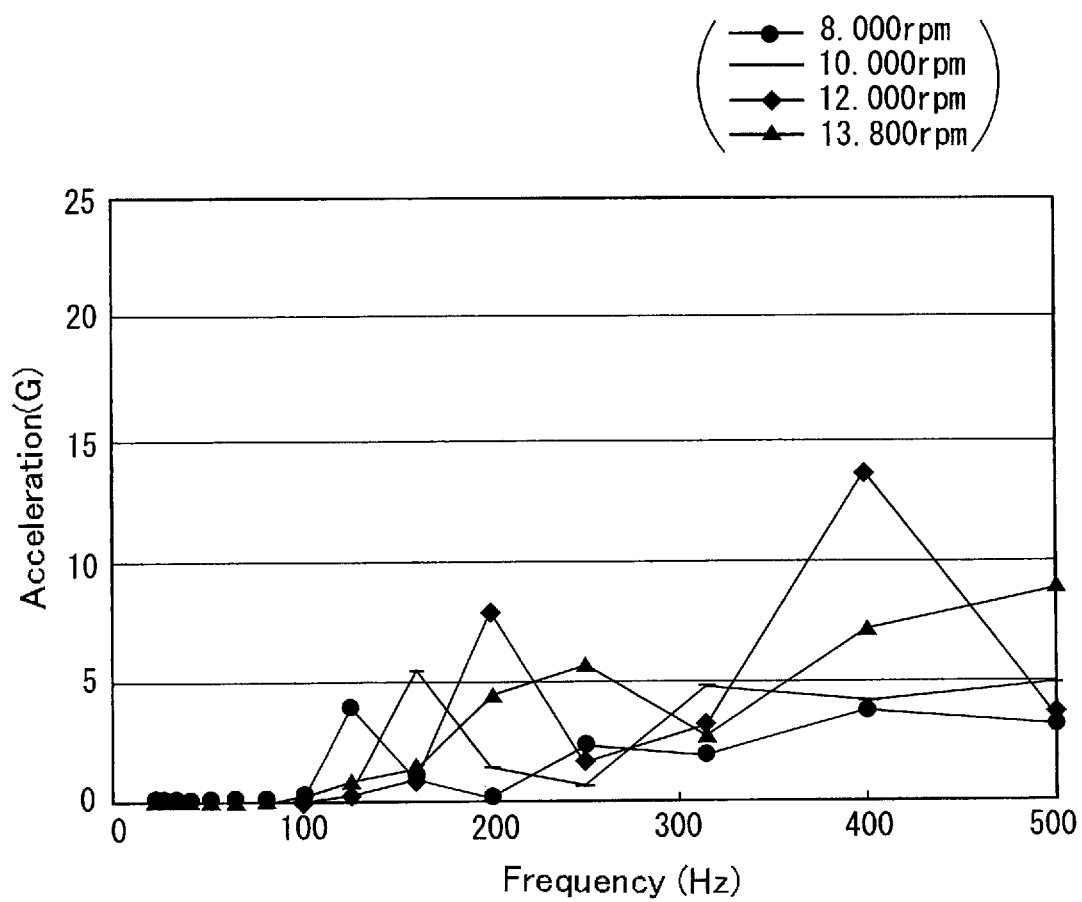
FIG. 9 shows right-and-left vibration detected on the drive source of the chain saw driven by the internal combustion engine.
Figure 10:
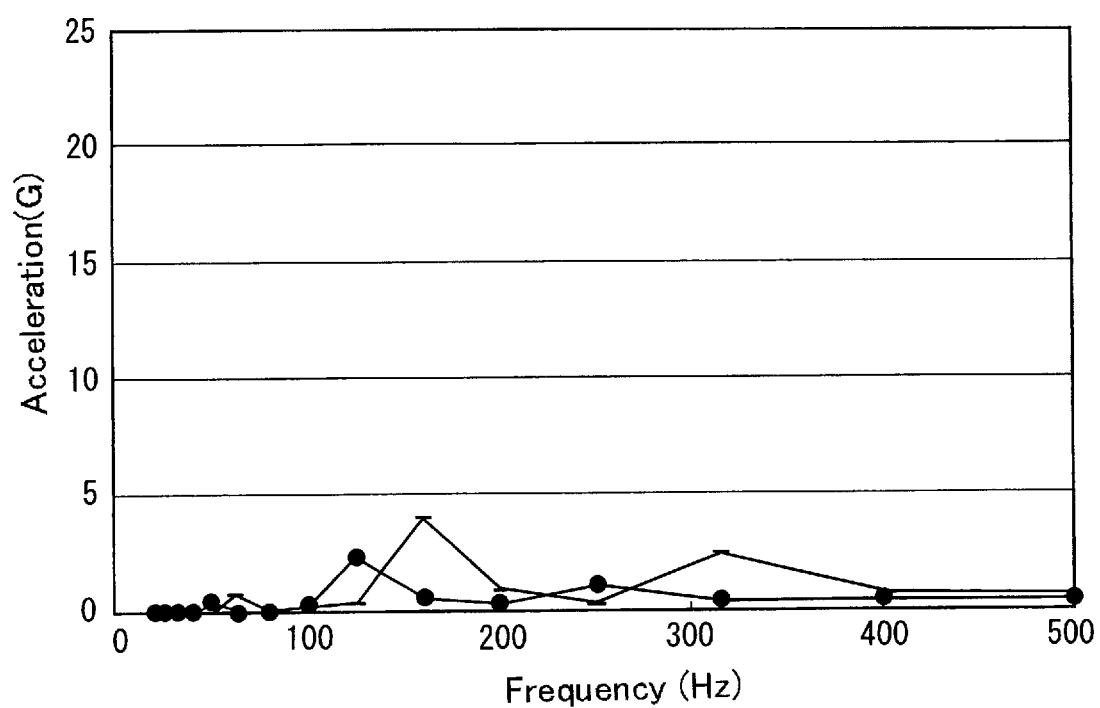
FIG. 10 shows up-and-down vibration detected on the drive source of a hedge trimmer driven by an internal combustion engine.
Figure 11:
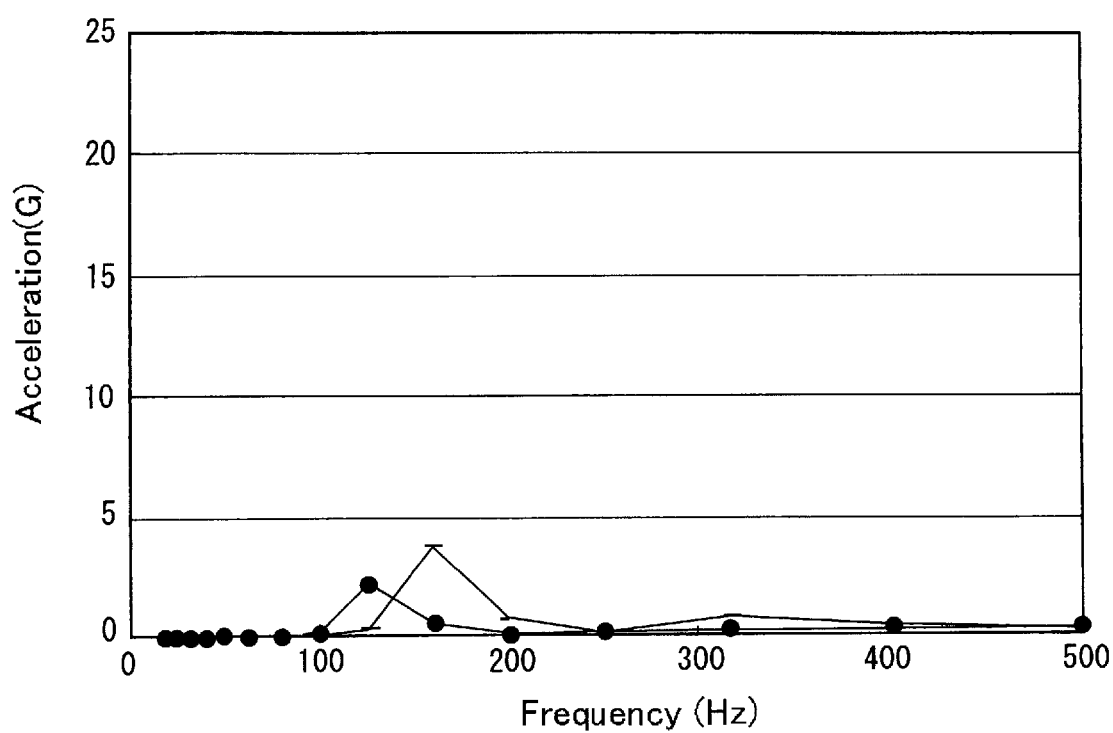
FIG. 11 shows front-and-rear vibration detected on the drive source of the hedge trimmer driven by the internal combustion engine.
Figure 12:
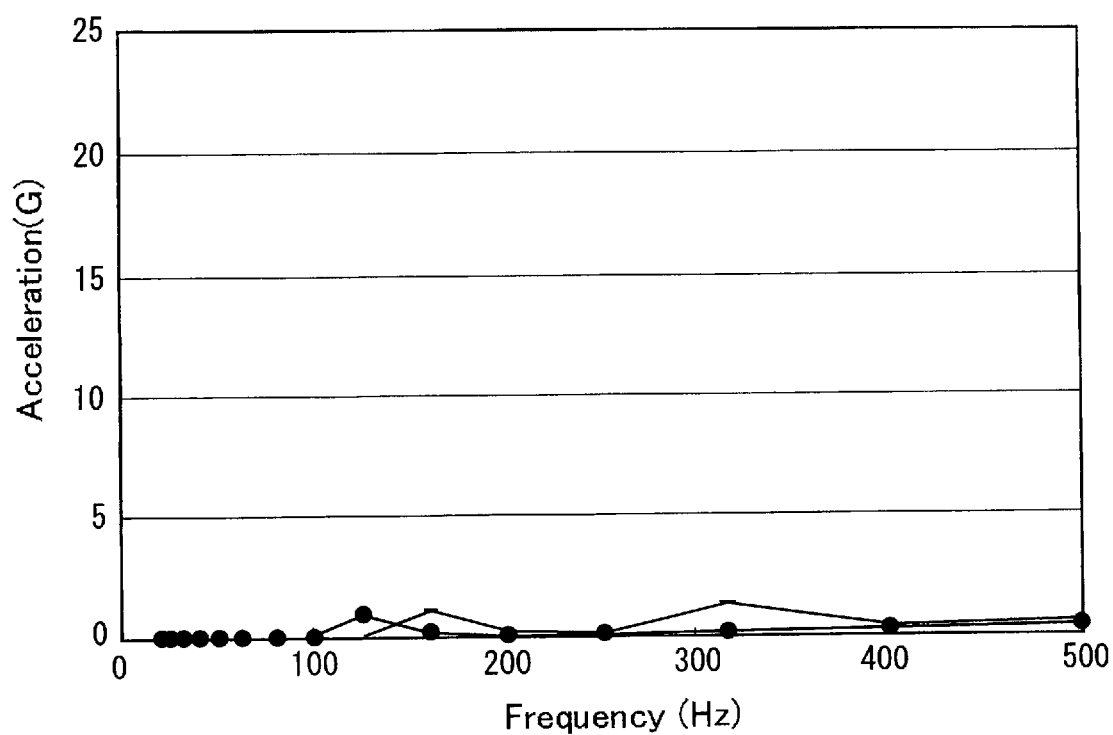
FIG. 12 shows right-and-left vibration detected on the drive source of the hedge trimmer driven by the internal combustion engine.

In the brush cutter 100 with the single-cylinder internal combustion engine 14, the acceleration peak peculiar to the drive unit 4 is found in a range of frequencies higher than about 100 Hz but not in the range of frequencies lower than 100 Hz, as having been mentioned above with reference to FIGS. 1 to 3. Therefore, filtering out the acceleration peak in the range of frequencies higher than 100 Hz by the filtering means 34 makes it possible to stop the engine 14 by detecting an unexpected unsafe condition such as kickback, worker's falling or the like under no influence of the acceleration peculiar to the brush cutter 100 and operation of the latter.

Also, since acceleration or an acceleration peak in a range of frequencies lower than 100 Hz is amplified before the peak and threshold are compared with each other, it is easy to set a threshold and it is possible to improve the freedom of setting a threshold suitable for detection of a condition which will possibly change to an unexpected unsafe one. This is a preferable feature of this particular embodiment of the present invention.

Figure 29:
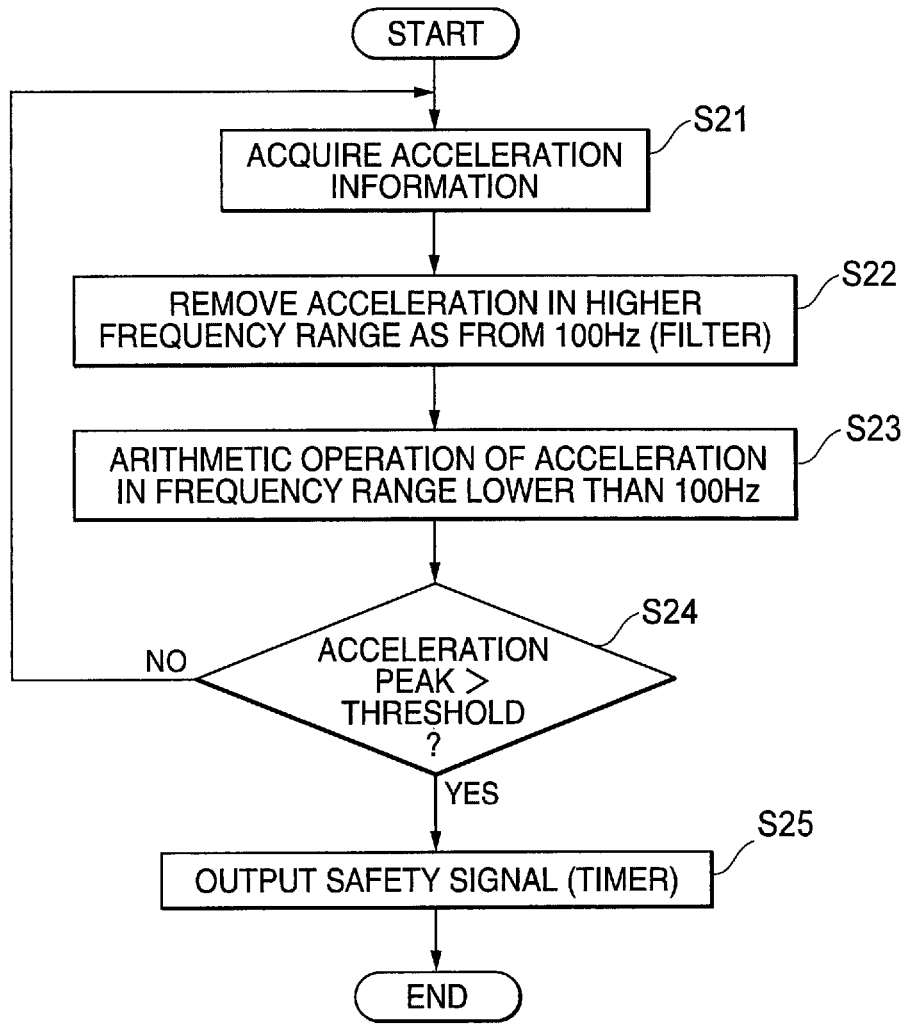
FIG. 29 shows a variant of the flow chart shown in FIG. 23.

FIG. 29 shows a variant of the series of steps shown in FIG. 23. Step S21 in the flow chart in FIG. 29 corresponds to step S1 in FIG. 23. In this step S21, acceleration information including frequency components is supplied from the acceleration sensor 24 to the controller 26. Acceleration in the range of frequencies higher than 100 Hz is filtered out in step S22 to extract acceleration in the range of frequencies lower than 100 Hz from the acceleration information supplied from the acceleration sensor 24. Then, computation is made to determine an acceleration peak in the range of frequencies lower than 100 Hz in step S23, and the acceleration peak is compared with a threshold in step S24. If the acceleration peak in the range of frequencies lower than 100 Hz is found higher than the threshold, the controller 26 proceeds to step S25 in which the controller 26 will issue a safety signal.

In a variant of the flow chart in FIG. 29, acceleration in the range of frequencies lower than 100 Hz may be amplified in the process from the filtering in step S22 to next step S23 or the acceleration peak determined by computation in step S23 may be amplified.

In the control system of the above-mentioned safety device, the uniaxial acceleration sensor 24 may be installed to the drive unit 4 with its detection axis directed in the up-and-down direction. Alternatively, it may be installed with the detection axis inclined relative to the up-and-down direction as will be explained below. More specifically, the acceleration sensor 24 may be installed to the brush cutter 100 with its detection axis directed in the up-and-down direction. Alternatively, the acceleration sensor 24 may be installed to the brush cutter 100 with its detection axis inclined relative to the up-and-down direction.

Figure 30:
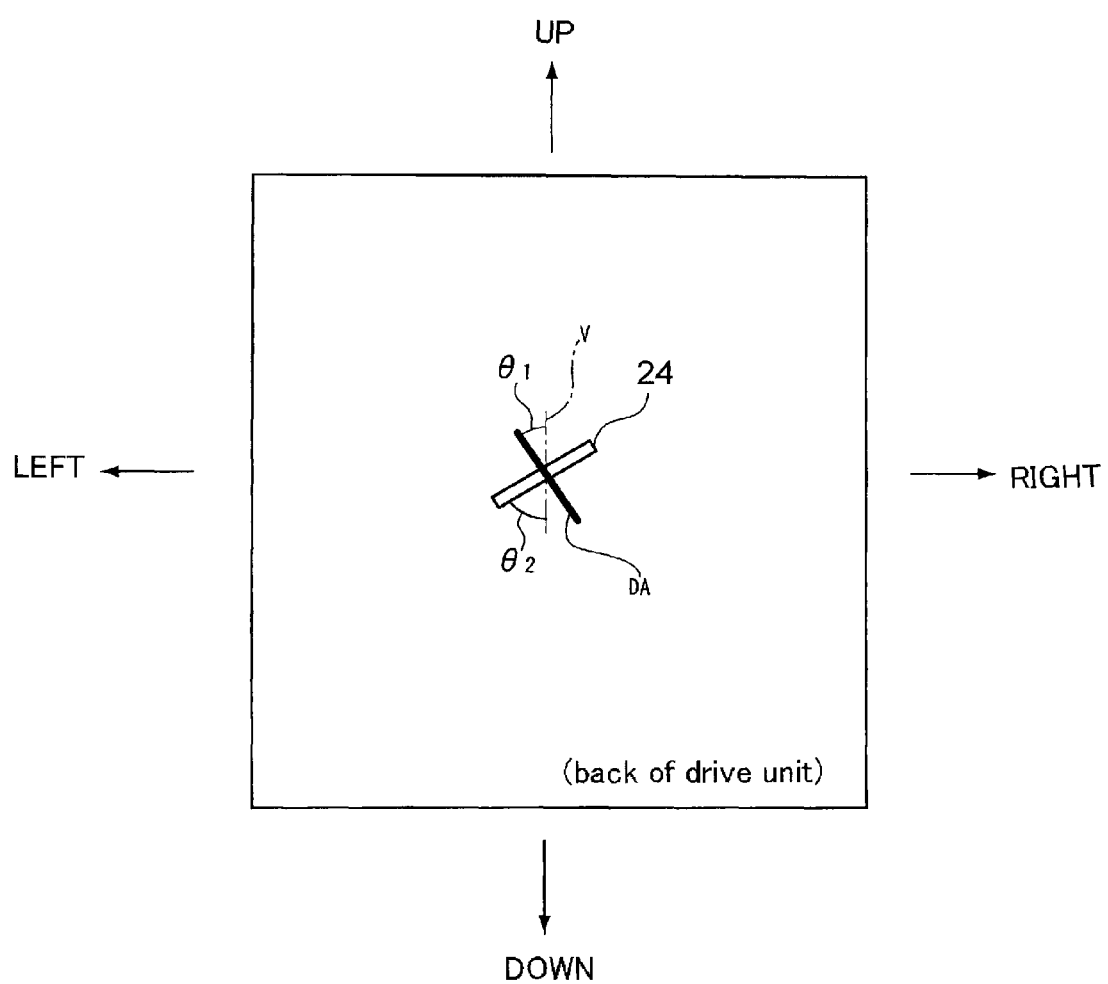
FIG. 30 explains that the acceleration sensor is installed at the back of the drive unit of the brush cutter obliquely relative to the up-and-down direction.

In FIG. 14, the single detection axis of the acceleration sensor 24 is indicated with an arrow DA. FIG. 30 explains the inclination of the detection axis DA of the acceleration sensor 24 installed to the back of the drive unit 4 with the brush cutter 100 being seated on a horizontal surface.

As best understood from FIG. 30, when the brush cutter 100 is seated on the horizontal surface, the acceleration sensor 24 is aslant relative to an up-and-down direction V on a vertical plane parallel to the axis of the cylinder bore. Accordingly, the detection axis DA inclines from the up-and-down direction V that is the axial direction of the cylinder bore in the vertical plane. The reference symbol θ1 in FIG. 30 indicates an angle at which the detection axis DA is inclined relative to the up-and-down direction V on the vertical plane.

With the acceleration sensor 24 installed to the drive unit 4 obliquely relative to the up-and-down direction V, the pickup surface of the acceleration sensor 24 is disposed oblique relative to the up-and-down direction. In FIG. 30, the inclination angle at which the pickup surface of the acceleration sensor 24 is inclined relative to the up-and-down direction is indicated with a reference symbol θ2.

The acceleration sensor 24 includes a shock detection member having a surface where a shock is received, and the detection axis DA of the acceleration sensor 24 is perpendicular to the pickup surface of the shock detection member. As will be explained later with reference to FIG. 40, when the detection axis DA is disposed obliquely relative to the up-and-down direction, the acceleration sensor 24 may be disposed near the engine 14 for the pickup surface thereof, for example, to be inclined forward or rearward, which is preferable especially in case the acceleration sensor 24 is of a uniaxial type. The uniaxial acceleration sensor 24 is thus able to detect shocks from all directions in a three-dimensional space with the sensitivity of the uniaxial acceleration sensor 24 being lowered against the up-and-down vibration. Also, adoption of the uniaxial acceleration sensor 24 advantageously permits to simplify the safety control by the controller 26.

Generally, the user works using the brush cutter 100 holds it in front of him with the manipulation tube 2 being inclined downward for the cutting blade 48 at the front end thereof to be near the ground. Therefore, installing the acceleration sensor 24 obliquely relative to the up-and-down direction of the back (first vertical plane) of the drive unit 4 as in this embodiment is equal to positioning the acceleration sensor 24 obliquely to all the three planes in the three-dimensional space in the actual working environment.

Figure 31:
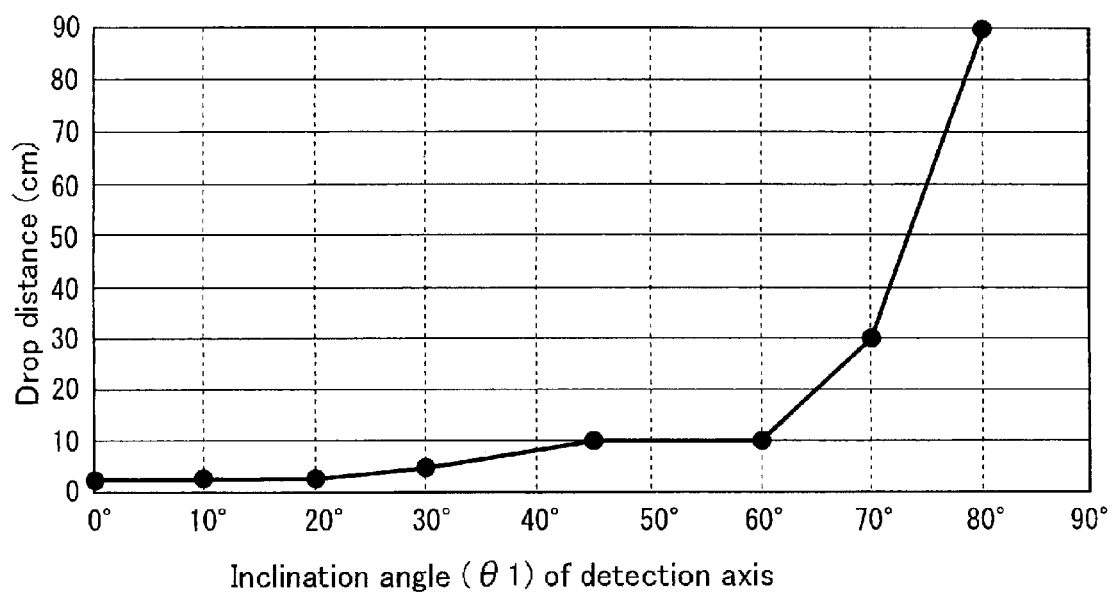
FIG. 31 shows measured data on the relation between the inclination angle of the detection axis and sensitivity of the acceleration sensor when the acceleration sensor is installed with the axis of direction thereof being inclined relative to the up-and-down direction.

FIG. 31 shows the relation between the inclination angle θ1 of the detection axis DA of the acceleration sensor 24 and sensitivity of the acceleration sensor 24. FIG. 31 shows measured drops of the brush cutter 100 at which the acceleration sensor 24 delivered predetermined output values when the brush cutter 100 was dropped vertically to the ground. Namely, the data in FIG. 31 are those measured when it was tested by dropping the brush cutter 100 from a variety of height whether or not the acceleration sensor 24 delivered shock detection signals higher than a predetermined level.

FIG. 31 shows relation between the inclination angle θ1 of the detection axis DA of the acceleration sensor unit 24 and sensitivity of the acceleration sensor unit 24. Data of FIG. 31 was obtained by measuring vertical drop distances of the brush cutter 100 dropping to the ground and monitoring responsive outputs of a predetermined value from the acceleration unit 24. In other words, the data of FIG. 31 shows to which value of height for dropping the acceleration sensor unit 24 was responsive and outputted a shock detection signal in the test of having the brush cutter 100 free-fall from various heights to the ground.

Referring back to FIG. 14 again, the installed position of the acceleration sensor 24 can be adjusted, by loosening a screw 28, to have an arbitrary angle of inclination in a range from a first inclined position indicated with a solid line to a second inclined position indicated with an imaginary line. The inclination angle θ1 of the detection axis DA can be thus changed. Of course, the acceleration sensor 24 can be fixed in an inclined position by tightening the screw 28. The above embodiment is designed for the user of the brush cutter 100 to be able to make free selection between the two different inclined positions, namely, the first inclined position indicated with the solid line and second inclined position indicated with the imaginary line, in FIG. 14 by turning the acceleration sensor 24 about the screw 28. However, it should be noted that the brush cutter 100 may be arranged such that the user can select one of three or more inclined positions. The brush cutter 100 may also be designed so that the inclination angle θ2 of the pickup surface of the acceleration sensor 24 can be freely set between the first and second inclined positions.

Since the detection axis DA of the acceleration sensor 24 inclines relative to the up-and-down direction V because of the inclined mounting orientation of the acceleration sensor 24, it is possible to lower the intrinsic sensitivity of the acceleration sensor 24 to up-and-down vibration of the drive unit 4, namely, the engine vibration, which is caused by normal operation of the engine 14 of the brush cutter 100 as already explained with reference to FIG. 1. In addition, the intrinsic sensitivity of the acceleration sensor 24 can be lowered in relation to a large up-and-down vibration due to the unbalance of the cutting blade 48 having been described above with reference to FIGS. 25 to 27.

Figure 32:
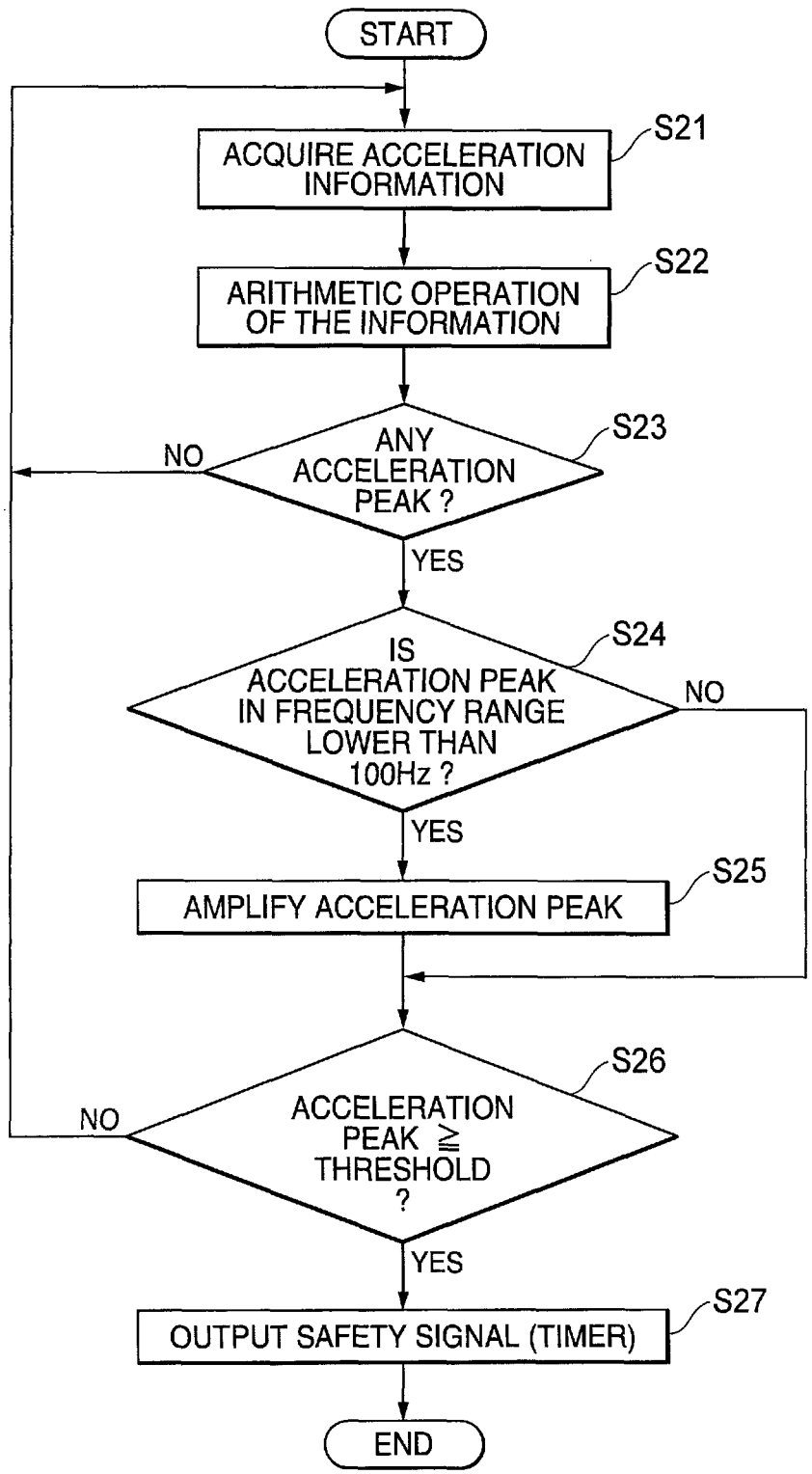
FIG. 32 shows, as an example, a flow of operations done by the controller with the acceleration sensor being installed with its detection axis being inclined.

FIG. 32 shows an example of a series of operations made using a common threshold to detect kickback or the like due to acceleration in a range of frequencies lower than 100 Hz and detect an unbalance of the cutting blade 48 having been explained above with reference to FIGS. 25 to 27. Since steps S21 to S27 in the flow chart in FIG. 32 correspond to steps S1 to S7 in FIG. 23, the steps S21 to 27 in FIG. 32 are not be described here. Instead, characteristics of this example are explained below. If the result of judgment in step S24 (in FIG. 32) is negative (NO), namely, if it is determined that an acceleration peak exists in the range of frequencies higher than 100 Hz, the controller 26 proceeds to step S26 in which it will compare the acceleration peak in the higher-frequency range with the common threshold. When the acceleration peak in the higher-frequency range is higher than the common threshold, the controller 26 proceeds to step S27 in which it will issue a safety signal continuously for a time of 5 sec, for example. With the safety signal, the engine is stopped or the brake be applied to stop the cutting blade 48 from rotating. The common threshold in step S26 is also applied to an acceleration peak in the range of frequencies lower than 100 Hz and used for detection of kickback or worker's falling as having been previously described above with reference to the flow chart in FIG. 23.

Since the sensitivity of the acceleration sensor 24 to up-and-down vibration due to unbalance of the cutting blade 48 is lowered than usual because of the aslant orientation of the acceleration sensor 24 relative to the up-and-down direction as already explained, the acceleration peak due to the unbalance of the cutting blade 48 exhibits a smaller value than the original one. On the other hand, occurrence of unbalance and kickback of the cutting blade 48, etc. can be detected using a common threshold by setting such an amplification factor for the acceleration peak in the range of frequencies lower than 100 Hz that the acceleration peak due to kickback etc. is nearly equal to the above-mentioned acceleration peak due to unbalance of the cutting blade 48. This is not limited for the acceleration sensor 24 formed from a uniaxial sensor but is also true for the acceleration sensor 24 formed from a biaxial or triaxial sensor.

Figure 33:
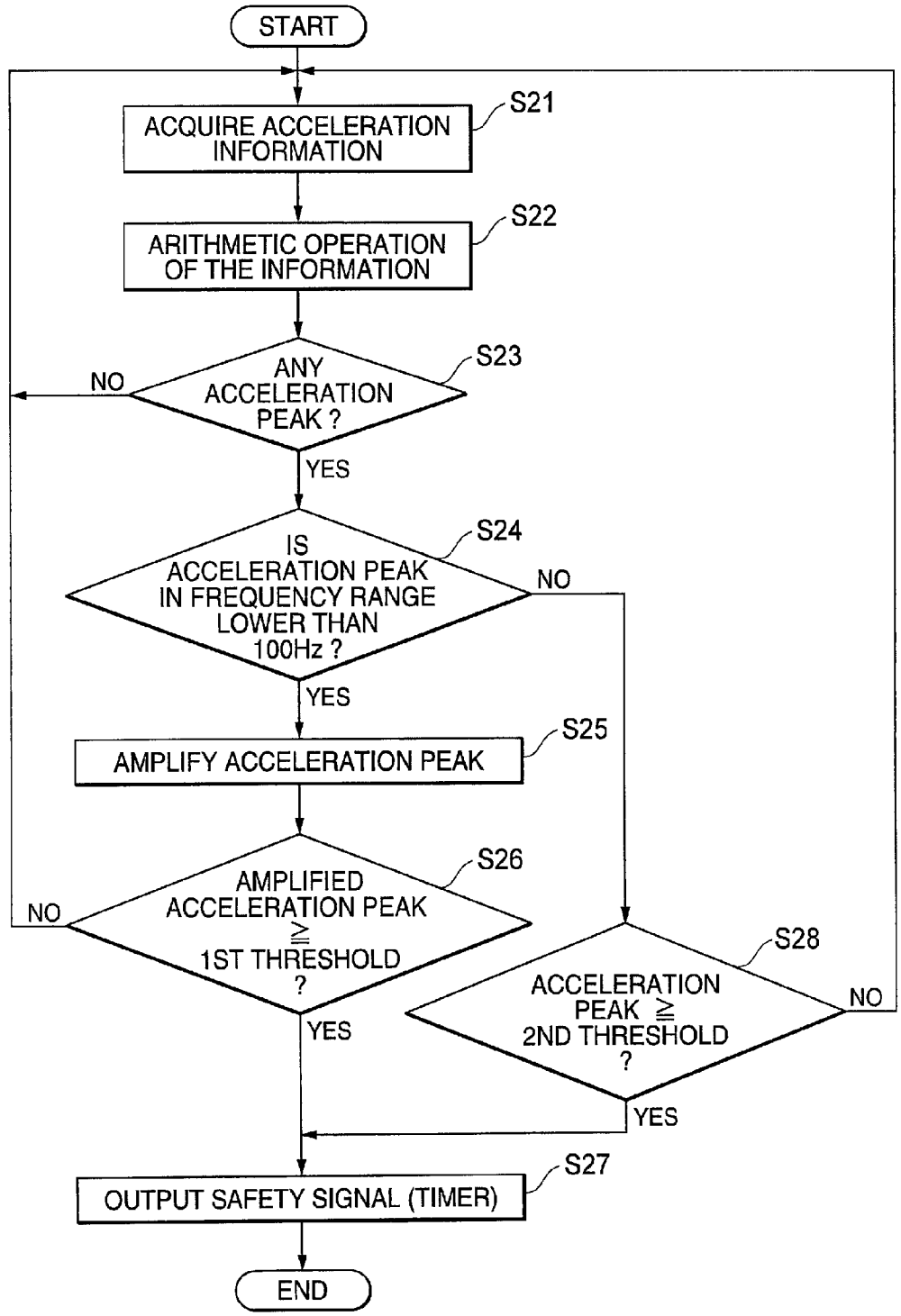
FIG. 33 shows a variant of the flow chart shown in FIG. 32.

In the series of operations having been explained above with reference to the flow chart in FIG. 32, the acceleration peak in the range of frequencies lower than 100 Hz and that in the range of frequencies higher than 100 Hz are compared with the common threshold (as in step S26). As shown in FIG. 33, however, the acceleration peak in the range of frequencies lower than 100 Hz may be compared with a first threshold, while the acceleration peak in the range of frequencies higher than 100 Hz may be compared with a second threshold (as in step S28). As the second threshold, a value is set which is larger than 14 G (in FIG. 1) as having been described with reference to FIG. 24, while being smaller than 24 G when the cutting blade 48 is unbalanced (as in FIG. 25). Thus, it is possible to detect that the cutting blade 48 is unbalanced during bush cutting.

Figure 34:
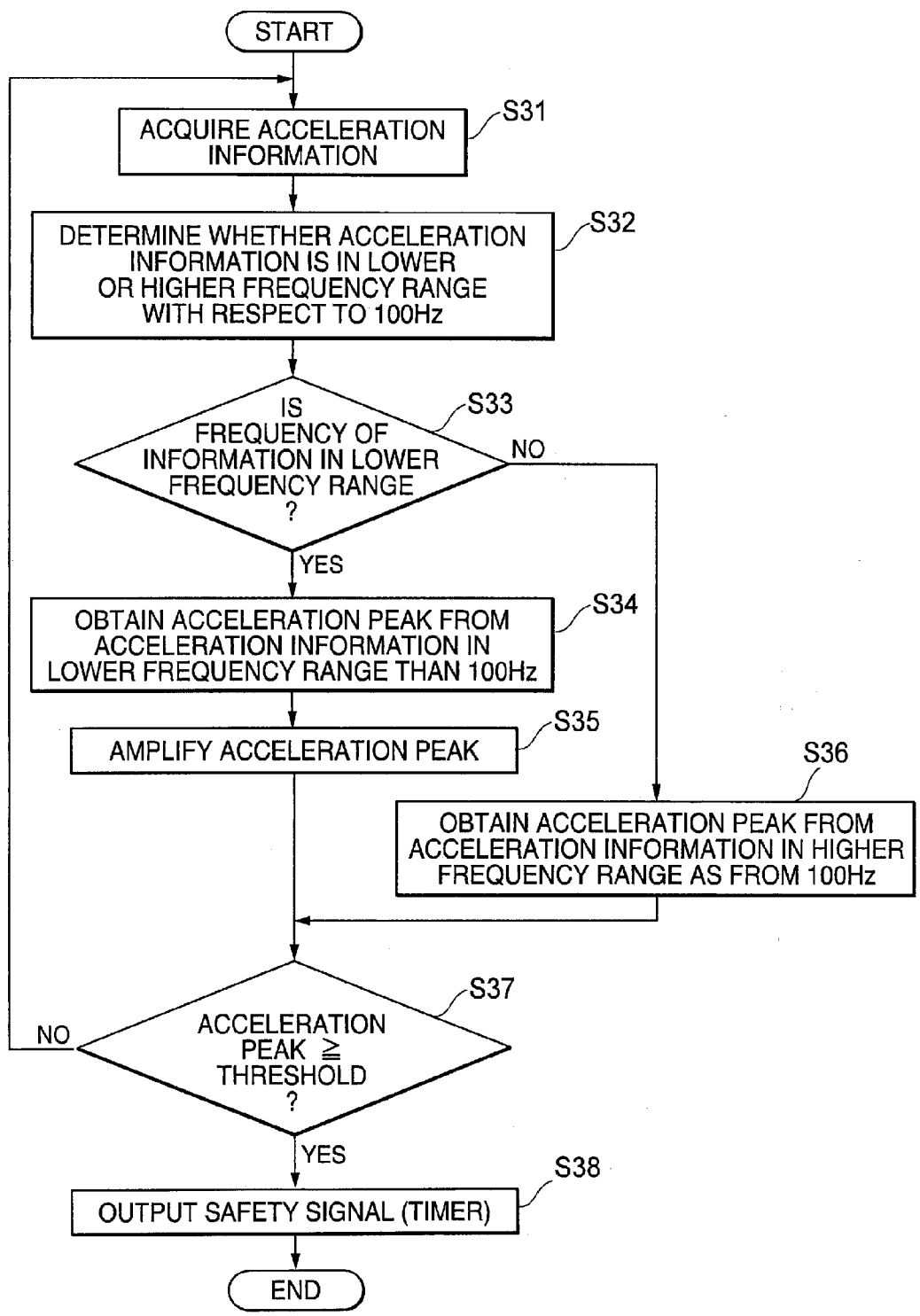
FIG. 34 shows another variant of the flow chart shown in FIG. 32.

FIG. 34 shows another variant of the flow chart shown in FIG. 32. As shown in the control process shown in the flow chart in FIG. 34, acceleration information is supplied to the controller 26 from the acceleration sensor 24 in step S31. In step S32, it is judged based on the acceleration information supplied from the acceleration sensor 24 whether the acceleration has occurred in the range of frequencies lower than 100 Hz or in the range of frequencies higher than 100 Hz. Then in step S33, it is judged whether the acceleration in the acceleration information from the acceleration sensor 24 has occurred in the lower-frequency range. When the result of judgment in step S33 is affirmative (YES), namely, if the acceleration has occurred in that range, the controller proceeds to step S34 in which an acceleration peak is determined by computation based on the information on the acceleration in the lower-frequency range. In the next step S35, the acceleration peak is amplified.

However, if the result of judgment in step S33 is negative (NO), namely, if the acceleration has occurred in the higher-frequency range, the controller 26 proceeds to step S36 in which an acceleration peak is determined by computation based on the information on the acceleration in the higher-frequency.

The acceleration peak, amplified in step S35, in the lower-frequency range and acceleration peak determined by computation based on the information on the acceleration in the higher-frequency range in step S36 are compared with a common threshold in step S37. If the acceleration peak in the low- and/or or higher-frequency range is higher than the threshold, the controller 26 proceeds to step S38 in which it will issue a safety signal. In the flow chart in FIG. 34, the acceleration peak in the range of frequencies higher than 100 Hz and that in the range of frequencies lower than 100 Hz are compared with the common threshold as in step S37. In a variant of the flow chart in FIG. 34, however, the acceleration peak in the range of frequencies lower than 100 Hz may be compared with a first threshold, while the acceleration peak in the range of frequencies higher than 100 Hz may be compared with a second threshold, as having been described above with reference to FIG. 33.

Further in the above-mentioned brush cutter 100, the inclination angle θ2 of the pickup surface of the acceleration sensor 24 can be adjusted by loosening the screw 28. For example, after actually using the brush cutter 100, the worker may want the safety device to be less sensitive to engine vibration and vibration caused by unbalance of the cutting blade 48. In this case, the worker can reset the acceleration sensor 24 to a second inclined position, indicated with an imaginary line in FIG. 14, in which it is more upright more closely to the up-and-down direction V. This will meet the user's demand.

The brush cutter 100 according to the above embodiment is adapted to stop the engine 14 in order to prevent the worker from falling into an unexpected unsafe condition and/or to stop the engine 14 when the cutting blade 48 is unbalanced. In a variant of this embodiment, however, there may be provided a brake mechanism to forcibly stop the cutting blade 48 directly or indirectly from rotating, while stopping the engine, or instead of stopping the engine 14.

Figure 35:
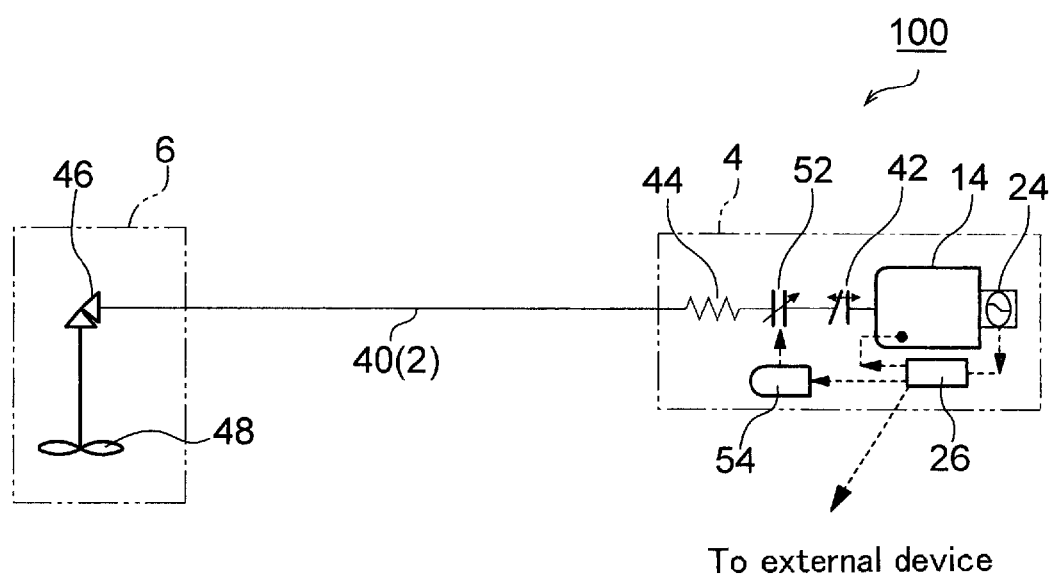
FIG. 35 shows an example adapted to stop the engine and brake the output from a centrifugal clutch when the acceleration sensor detects a shock.

FIG. 35 shows an example in which a brake 52 having an actuator (disabling means) 54 is provided between the centrifugal clutch 42 and damper 44 and a safety signal is supplied to the actuator 54 of the brake 52 to apply a braking force to the output of the centrifugal clutch 42 and thus stop the cutting blade 48 forcibly from rotating. It should be noted that in the example shown in FIG. 35, a safety signal issued from the controller 26 is supplied to an external device. The external device is a communication means, for example, which will receive the safety signal from the controller 26 and send an alarm to a work or business management company employing or managing the worker or a mobile phone of the worker's family.

Figure 36:
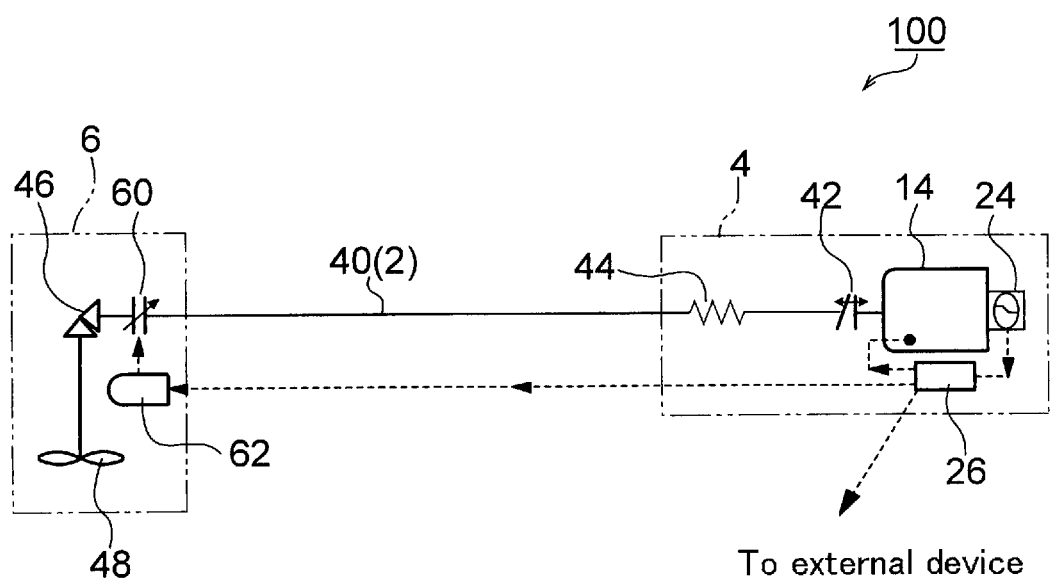
FIG. 36 shows an example adapted to stop the engine and additionally brake the input to a bevel gear of a cutting blade portion when the acceleration sensor detects a shock.

FIG. 36 shows another example of the target for the control. In the example shown in FIG. 36, a brake 60 having an actuator 62 (a means of disabling the cutting blade from rotating) is provided just upstream of the bevel gear 46 in the cutting unit 6. The safety signal from the controller 26 is supplied to the actuator 62 of the brake 60 to apply a braking force to just upstream of the bevel gear 46 for thereby stopping the cutting blade 48 forcibly from rotating. Since the cutting blade 48 is located just downstream of the bevel gear 46, the cutting blade 48 can be forcibly stopped in a direct manner from rotating. In a variant of the embodiment shown in FIG. 36, a brake may be provided as a disabling means at the end of the manipulation tube 2 to apply a braking force to the end portion of the power transmission shaft 40, for thereby stopping the cutting blade 48 directly from rotating.

The acceleration sensor 24 may of course be positioned in any appropriate location in the drive unit 4, such as on the inner surface of the engine cover 12 or in a dead space of the drive unit 4. Furthermore, location of the acceleration sensor 24 is not limited to the portion of the drive unit 4. If it is possible to differentiate between a frequency range in which acceleration due to vibration peculiar to the brush cutter 100 and operation of the latter shows a peak and a frequency range in which the acceleration shows a peak in a condition in which the worker using the brush cutter 100 is unexpectedly vulnerable, the acceleration sensor 24 may be provided on the handle 8 (as in FIG. 13) or at the end of the manipulation tube 2, for example.

Figure 37:
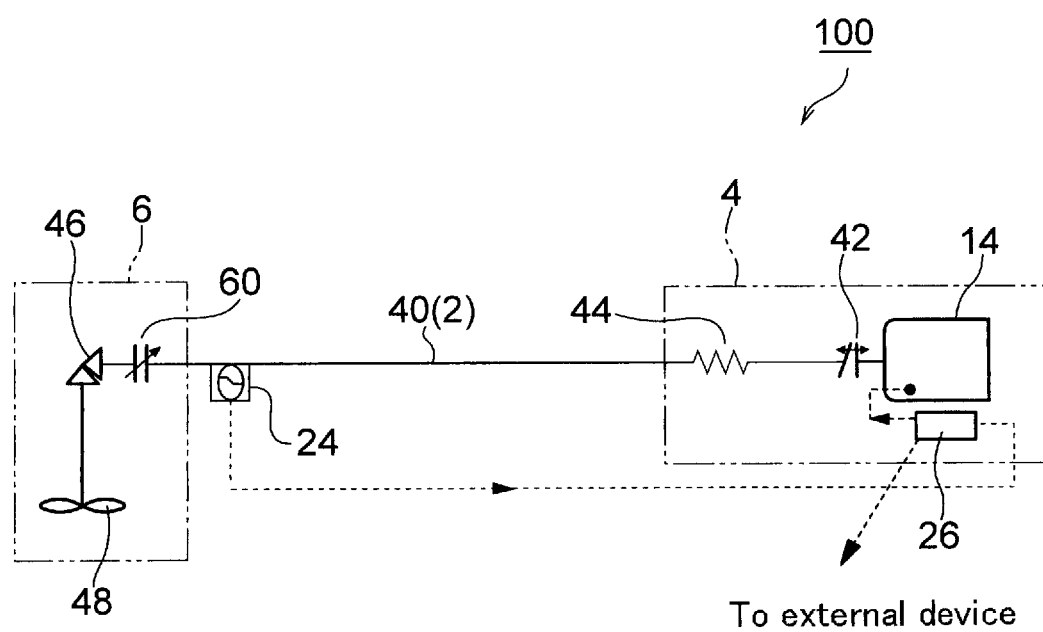
FIG. 37 shows an example with the acceleration sensor installed to the end of the manipulation tube of the brush cutter and adapted to stop the engine when the acceleration sensor detects a shock.
Figure 38:
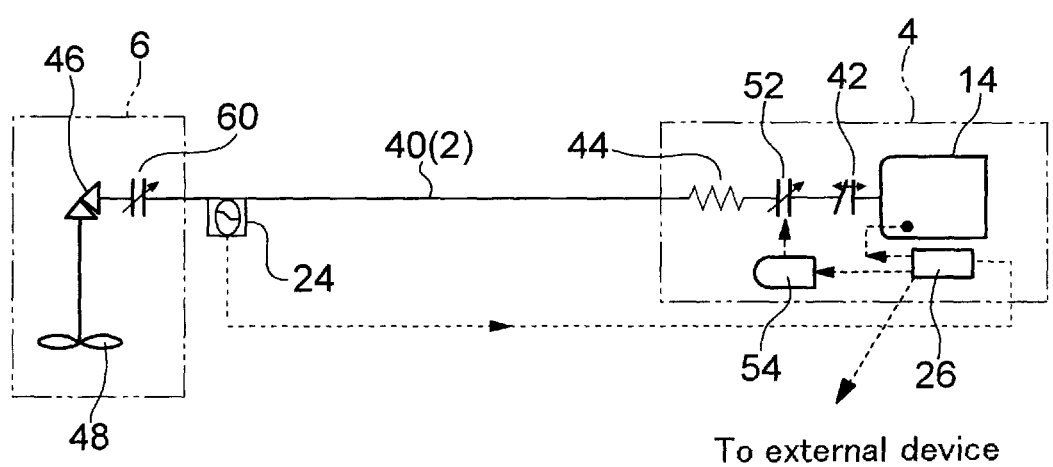
FIG. 38 shows an example with the acceleration sensor installed to the end of the manipulation tube of the brush cutter and adapted to stop the engine and additionally brake the engine output by using a brake provided between a centrifugal clutch and a damper when the acceleration sensor detects a shock.
Figure 39:
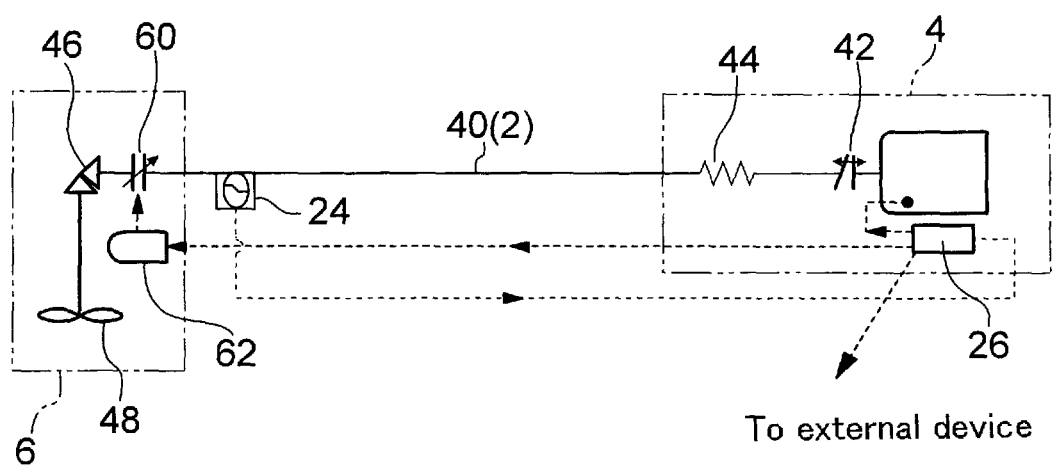
FIG. 39 shows an example with the acceleration sensor installed to the end of the manipulation tube of the brush cutter and adapted to stop the engine and additionally brakes the input to a bevel gear of the cutting blade when the acceleration sensor detects a shock.

FIGS. 37 to 39 show examples in which the acceleration sensor 24 is provided at the end of the manipulation tube 2. The engine as a safety-controlled object may be stopped as shown in FIG. 37. The engine output may be applied with a braking force from the brake 52 provided between the centrifugal clutch 42 and damper 44 as shown in FIG. 38. The power input to the bevel gear 46 at the cutting unit 6 may be applied with a braking force for stopping the cutting blade 48 directly from rotating as shown in FIG. 39.

Figure 40:
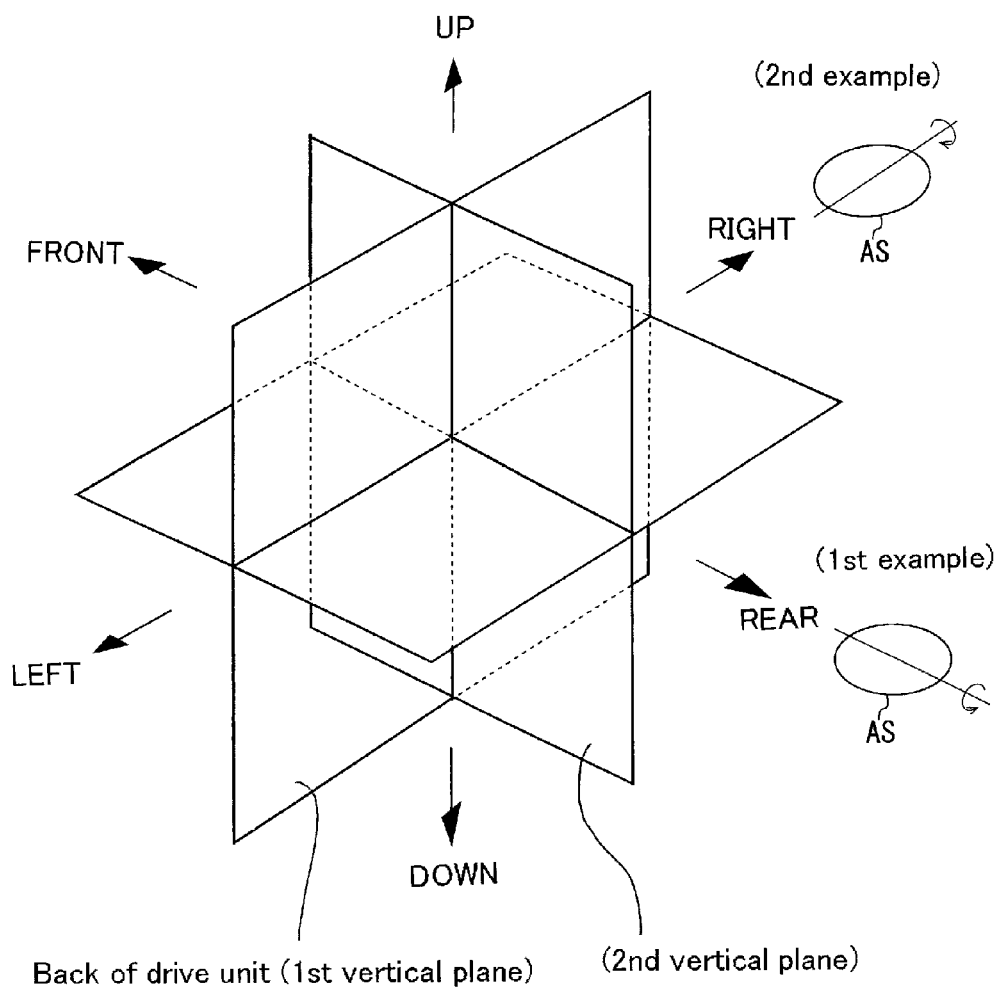
FIG. 40 explains the degree of freedom for changing the pickup surface of the acceleration sensor when the detection axis of the acceleration sensor is inclined relative to the up-and-down direction.

The axis perpendicular to the pickup surface of the acceleration sensor 24 is the axis of detection DA of the acceleration sensor 24. Therefore, in case the detection axis DA is inclined relative to the up-and-down direction, the pickup surface of the acceleration sensor 24 can be directed freely. FIG. 40 explains the degree of freedom in setting the direction of the pickup surface of the acceleration sensor 24 when the detection axis DA of the acceleration sensor 24 is disposed obliquely relative to the up-and-down direction. Among the terms "right", "left", "front", "rear", "up" and "down" in FIG. 40, the terms "right" and "left" in combination are used to specify the direction in which the cutting blade 48 is moved reciprocally by the worker in cutting operation with the brush cutter 100. The terms "front" and "rear" in combination are used to show the direction approximately along the extending direction of the manipulation tube 2. In case the brush cutter 100 has a single-cylinder internal combustion engine 14, the terms "up" and "down" in combination specify the axial direction of the cylinder bore of the internal combustion engine 14.

By turning the acceleration sensor 24 about its own front-and-rear (lengthwise) axis with the pickup surface of the acceleration sensor 24 being placed in a horizontal plane, the detection axis DA of the acceleration sensor 24 can be inclined relative to the up-and-down direction. In this first example, the acceleration sensor 24 can detect up-and-down vibration and right-and-left vibration. In another example, the detection axis DA of the acceleration sensor 24 can be disposed obliquely relative to the vertical line by turning the acceleration sensor 24 about its own right-and-left (transverse) axis thereof with the pickup surface of the acceleration sensor 24 placed in a horizontal plane. In this second example, the acceleration sensor 24 can detect up-and-down vibration and front-and-rear vibration. Of course, a combination of the first and second examples can detect acceleration in three directions, namely, in the right-and-left, front-and-rear and up-and-down directions.

In the foregoing, the present invention has been described concerning the embodiments and variants thereof with reference to the accompanying drawings. However, it should be noted that the drive source of the shoulder-strap type brush cutter 100 is not limited to an internal combustion engine but it may be an electric motor. Additionally, the embodiments have been explained of the shoulder-strap type brush cutter 100 as an example, but the present invention is applicable to a backpack type brush cutter of which the drive unit 4 is to be carried on the worker's back in bush cutting. In the case of the knapsack type brush cutter, the acceleration sensor 24 may be provided at other than the drive unit 4 carried on the worker's shoulder, for example, on the manipulation tube 2, handle 8 or the like, to detect a kickback phenomenon. Of course, the present invention is also applicable to a chain saw or hedge trimmer.

What is claimed is:
1. A work apparatus including a cutting tool and equipped with a safety device for stopping motion of the cutting tool upon detection of a particular phenomenon possibly inviting an unexpected, unsafe situation from acceleration information received from an acceleration sensor, comprising:

a single-cylinder internal combustion engine mounted in a drive unit in which a drive source for driving said cutting tool is provided;

a uniaxial, biaxial, or triaxial type acceleration sensor having one, two, or three detection axes and attached to said drive unit in such an orientation that said detection axes of said acceleration sensor extend aslant from an axial line of a cylinder bore of said internal combustion engine;

an arithmetic operation means supplied with acceleration information from said acceleration sensor and executing arithmetic operation of the acceleration information to find out an acceleration peak;

a frequency range judgment means for judging whether or not the acceleration peak found out by said arithmetic operation means is within a first frequency range in which acceleration peaks indicative of phenomena possibly inviting any unexpected, unsafe situations normally appear;

an amplification means for amplifying the acceleration peak in the first frequency range when the frequency range judgment means determines that the frequency of the acceleration peak is in the first frequency range;

a first comparison means for comparing the acceleration peak amplified by the amplification means with a first threshold;

a second comparison means for comparing the acceleration peak with a second threshold when the frequency range judgment means determines that the frequency of the acceleration peak is in a frequency out of the first frequency range; and an output means for issuing a safety signal to a disabling means when comparison of said first comparison means results in determining that the acceleration peak in the first frequency range is equal to or higher than the first threshold or when comparison of said second comparison means results in determining that the acceleration peak in the acceleration peak in the frequency range out of the first frequency range is equal to or higher than the second threshold, said disabling means responsively disabling said cutting tool of said work apparatus directly or indirectly to stop the cutting tool from moving.

2. The work apparatus according to claim 1, wherein a common threshold is used as the first and second thresholds.

3. The work apparatus according to claim 1, wherein the work apparatus is a hand-held, cutting machine, and said first frequency range is lower than 100 Hz.

4. The work apparatus according to claim 3, wherein a common threshold is used as the first and second thresholds.

5. The work apparatus according to claim 1, wherein the work apparatus is a brush cutter, a chainsaw, or a hedge trimmer.

6. A work apparatus including a cutting tool and equipped with a safety device for stopping motion of the cutting tool upon detection of a particular phenomenon possibly inviting an unexpected, unsafe situation from acceleration information received from an acceleration sensor, comprising:

a single-cylinder internal combustion engine mounted in a drive unit in which a drive source for driving said cutting tool is provided;

a uniaxial, biaxial, or triaxial type acceleration sensor having one, two, or three detection axes and attached to said drive unit in such an orientation that said detection axes of said acceleration sensor extend aslant from an axial line of a cylinder bore of said internal combustion engine;

a frequency range judgment means supplied with acceleration information from said acceleration sensor and judging whether an acceleration indicated by the acceleration information has a frequency in a first frequency range in which acceleration peaks indicative of phenomena possibly inviting any unexpected, unsafe situations normally appear or in a frequency range other than the first frequency range;

a first arithmetic operation means for executing arithmetic operation of the acceleration having the frequency in the first frequency range to find out an acceleration peak;

an amplification means for amplifying the acceleration peak found out from the acceleration having the frequency in the first frequency range;

a second arithmetic operation means for executing arithmetic operation of the acceleration having a frequency in the frequency range other than the first frequency range to find out an acceleration peak;

a first comparison means for comparing the acceleration peak in the first frequency range amplified by the amplification means with a first threshold;

a second comparison means for comparing the acceleration peak in the frequency range other than the first frequency range, which has been found out by the second arithmetic operation means, with a second threshold;

an output means for issuing a safety signal to a disabling means when comparison of said first comparison means results in determining that the acceleration peak in the first frequency range is equal to or higher than the first threshold or when comparison of said second comparison means results in determining that the acceleration peak in the acceleration peak in the frequency range out of the first frequency range is equal to or higher than the second threshold, said disabling means responsively disabling said cutting tool of said work apparatus directly or indirectly to stop the cutting tool from moving.

7. The work apparatus according to claim 6, wherein a common threshold is used as the first and second thresholds.

8. The work apparatus according to claim 6, wherein the work apparatus is a hand-held, cutting machine, and said first frequency range is lower than 100 Hz.

9. The work apparatus according to claim 8, wherein a common threshold is used as the first and second thresholds.

10. The work apparatus according to claim 6, wherein the work apparatus is a brush cutter, a chainsaw, or a hedge trimmer.

* * * * *